United States Patent
Suzuki

(10) Patent No.: US 10,922,033 B2
(45) Date of Patent: Feb. 16, 2021

(54) INFORMATION PROCESSING APPARATUS TRANSMITTING REQUESTS AND COMMUNICATION APPARATUS RECEIVING THE REQUESTS

(71) Applicant: BROTHER KOGYO KABUSHIKI KAISHA, Aichi (JP)

(72) Inventor: Satoshi Suzuki, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/255,930

(22) Filed: Jan. 24, 2019

(65) Prior Publication Data

US 2019/0227758 A1 Jul. 25, 2019

(30) Foreign Application Priority Data

Jan. 25, 2018 (JP) .................................. 2018-010374

(51) Int. Cl.
| | | |
|---|---|---|
| H04N 1/00 | (2006.01) |
| G06F 3/12 | (2006.01) |
| H04L 29/08 | (2006.01) |
| H04L 29/06 | (2006.01) |

(Continued)

(52) U.S. Cl.
CPC .......... *G06F 3/1236* (2013.01); *G06F 3/1222* (2013.01); *G06F 3/1287* (2013.01); *H04L 43/00* (2013.01); *H04L 61/1511* (2013.01); *H04L 61/2514* (2013.01); *H04L 63/00* (2013.01); *H04L 67/10* (2013.01); *H04L 69/16* (2013.01); *H04N 1/0001* (2013.01);

(Continued)

(58) Field of Classification Search
CPC .... G06F 3/1236; G06F 3/1287; G06F 3/1222;
H04L 69/16; H04L 67/10; H04L 61/2517;
H04L 61/2514; H04L 61/1511; H04L
43/00; H04L 63/00; H04L 29/06904;
H04N 1/0001; H04N 1/00031; H04N
1/00061; H04N 1/00074
USPC ............... 358/1.11–1.18, 1.9, 2.1; 726/1–12,
726/26–30; 709/217–229
See application file for complete search history.

(56) References Cited

U.S. PATENT DOCUMENTS

| | | | | |
|---|---|---|---|---|
| 2007/0011319 A1* | 1/2007 | McClure | ................ | G02B 6/105 709/224 |
| 2014/0359707 A1* | 12/2014 | Smithson | ................ | H04L 63/08 726/4 |
| 2016/0337393 A1* | 11/2016 | Tsuchitoi | ............ | H04L 63/1433 |

FOREIGN PATENT DOCUMENTS

JP 2016-212832 A 12/2016

* cited by examiner

*Primary Examiner* — Chad Dickerson
(74) *Attorney, Agent, or Firm* — Scully Scott Murphy and Presser

(57) ABSTRACT

In a communication apparatus, a processor receives first and second requests from an external device via an internet. The first request has first port information indicating a first port. The second request has second port information indicating a second port. In response to receiving the first and second requests, the processor transmits first and second responses to the external device via the internet. After transmitting the first response and the second response, the processor receives result information from the external device via the internet. The result information is based on a fact that the external apparatus receives the first request and the second request; and performing an addressing process on a basis of the result information. The addressing process is for addressing a security issue concerning the first port and the second port.

13 Claims, 12 Drawing Sheets

(51) Int. Cl.
*H04L 29/12* (2006.01)
*H04L 12/26* (2006.01)
(52) U.S. Cl.
CPC ..... *H04N 1/00031* (2013.01); *H04N 1/00061* (2013.01); *H04N 1/00074* (2013.01); *H04L 61/2517* (2013.01)

FIG. 2

PORT FORWARDING CONFIGURATION TABLE FT

| TARGET IP ADDRESS | TARGET PORT NUMBER | FORWARDING DESTINATION IP ADDRESS |
|---|---|---|
| GIP_M (RELAY DEVICE 30A) | P_lpr | LIP_M (MFP 200A) |
| GIP_M (RELAY DEVICE 30A) | P_raw | LIP_M (MFP 200A) |

FIG. 4 (A)
DIAGNOSTICS REQUEST A

- SOURCE IP ADDRESS = LIP_M
- DESTINATION IP ADDRESS = GIP_S
- SOURCE PORT NUMBER = P_mfp
- DESTINATION PORT NUMBER = P_html
- DESTINATION INFORMATION

FIG. 4 (B)
DIAGNOSTICS REQUEST B

- SOURCE IP ADDRESS = GIP_M
- DESTINATION IP ADDRESS = GIP_S
- SOURCE PORT NUMBER = P_mfp
- DESTINATION PORT NUMBER = P_html
- DESTINATION INFORMATION

FIG. 4 (C)
LPR CONNECTION REQUEST A

- SOURCE IP ADDRESS = GIP_S
- DESTINATION IP ADDRESS = GIP_M
- SOURCE PORT NUMBER = P_sev
- DESTINATION PORT NUMBER = P_lpr

FIG. 4 (D)
RAW CONNECTION REQUEST A

- SOURCE IP ADDRESS = GIP_S
- DESTINATION IP ADDRESS = GIP_M
- SOURCE PORT NUMBER = P_sev
- DESTINATION PORT NUMBER = P_raw

FIG. 4 (E)
SNMP CONNECTION REQUEST A

- SOURCE IP ADDRESS = GIP_S
- DESTINATION IP ADDRESS = GIP_M
- SOURCE PORT NUMBER = P_sev
- DESTINATION PORT NUMBER = P_snmp

FIG. 4 (F)
DIAGNOSTIC RESULTS RESPONSE A

- SOURCE IP ADDRESS = GIP_S
- DESTINATION IP ADDRESS = GIP_M
- SOURCE PORT NUMBER = P_html
- DESTINATION PORT NUMBER = P_mfp
- RESULTS INFORMATION

FIG. 4 (G)
DIAGNOSTIC RESULTS RESPONSE B

- SOURCE IP ADDRESS = GIP_S
- DESTINATION IP ADDRESS = LIP_M
- SOURCE PORT NUMBER = P_html
- DESTINATION PORT NUMBER = P_mfp
- RESULTS INFORMATION

FIG. 9 (A)

LPR CONNECTION REQUEST B

- SOURCE IP ADDRESS = GIP_S
- DESTINATION IP ADDRESS = LIP_M
- SOURCE PORT NUMBER = P_sev
- DESTINATION PORT NUMBER = P_lpr

FIG. 9 (B)

LPR RESPONSE A

- SOURCE IP ADDRESS = LIP_M
- DESTINATION IP ADDRESS = GIP_S
- SOURCE PORT NUMBER = P_lpr
- DESTINATION PORT NUMBER = P_sev

FIG. 9 (C)

LPR RESPONSE B

- SOURCE IP ADDRESS = GIP_M
- DESTINATION IP ADDRESS = GIP_S
- SOURCE PORT NUMBER = P_lpr
- DESTINATION PORT NUMBER = P_sev

FIG. 9 (D)

RAW CONNECTION REQUEST B

- SOURCE IP ADDRESS = GIP_S
- DESTINATION IP ADDRESS = LIP_M
- SOURCE PORT NUMBER = P_sev
- DESTINATION PORT NUMBER = P_raw

FIG. 9 (E)

RAW RESPONSE A

- SOURCE IP ADDRESS = LIP_M
- DESTINATION IP ADDRESS = GIP_S
- SOURCE PORT NUMBER = P_raw
- DESTINATION PORT NUMBER = P_sev

FIG. 9 (F)

RAW RESPONSE B

- SOURCE IP ADDRESS = GIP_M
- DESTINATION IP ADDRESS = GIP_S
- SOURCE PORT NUMBER = P_raw
- DESTINATION PORT NUMBER = P_sev

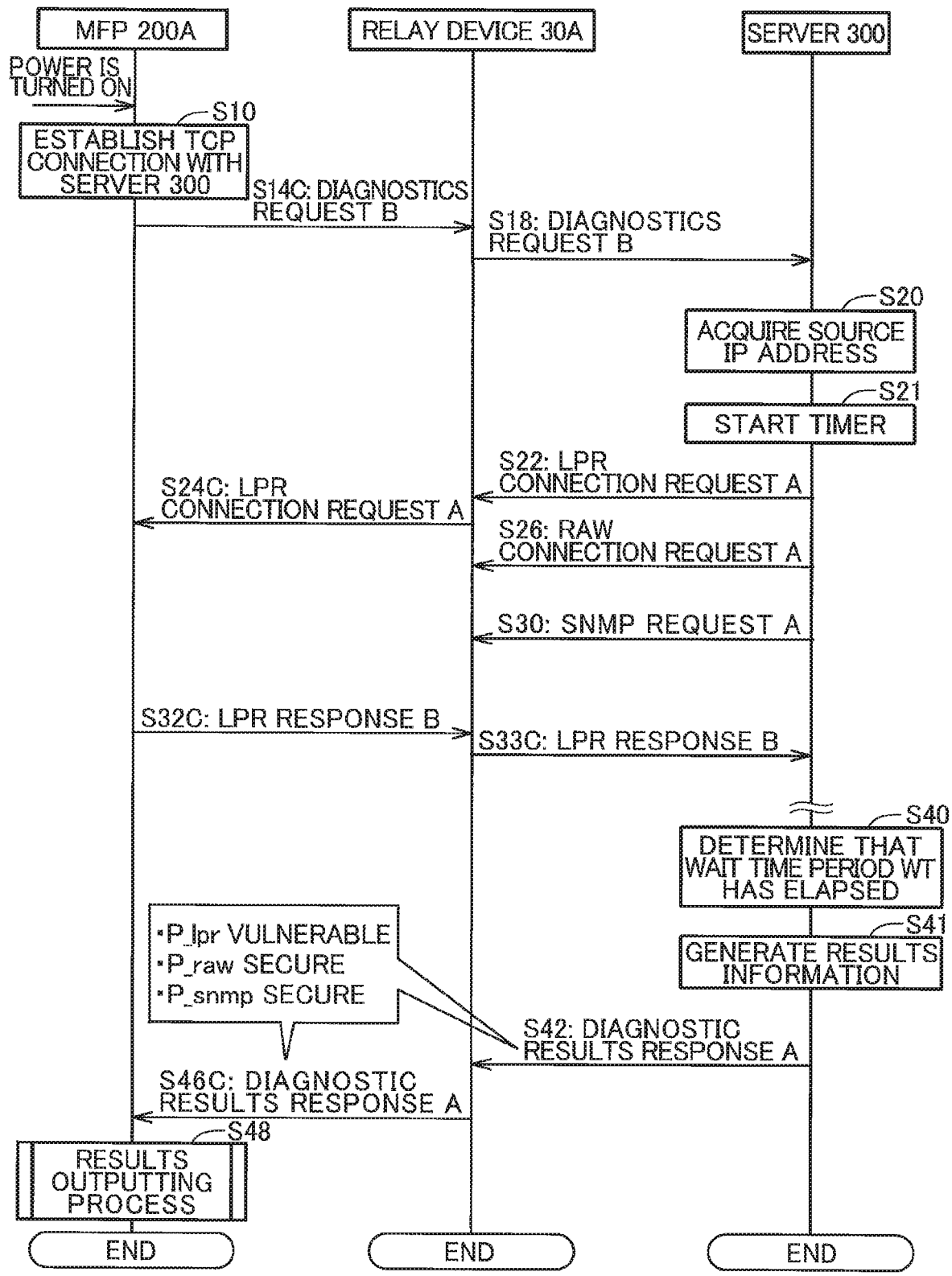

INFORMATION PROCESSING APPARATUS TRANSMITTING REQUESTS AND COMMUNICATION APPARATUS RECEIVING THE REQUESTS

CROSS REFERENCE TO RELATED APPLICATION

This application claims priority from Japanese Patent Application No. 2018-010374 filed Jan. 25, 2018. The entire content of the priority application is incorporated herein by reference.

TECHNICAL FIELD

The present disclosure relates to a method of controlling a communication apparatus and an external apparatus connected to each other over the Internet.

BACKGROUND

Using a conventional technique, a multifunction peripheral (MFP) transmits to a server request data specifying its own IP address as the destination IP address. The server transmits to the MFP response data specifying in the application layer the destination IP address included in the request data received from the MFP. When the IP address specified in the application layer of the response data matches the MFP's own IP address, the MFP determines that the MFP is publicly accessible on the global network.

SUMMARY

However, simply determining whether the MFP is publicly accessible on the global network is not always sufficient information to determine whether the security of the MFP has been compromised. Consequently, the conventional technology may not be able to suitably address security issues involving external apparatuses accessing the MFP over the Internet.

In view of the foregoing, it is an object of the present disclosure to provide a technique capable of suitably addressing security issues for a communication apparatus.

In order to attain the above and other objects, the disclosure provides a communication apparatus. The communication apparatus includes a processor configured to perform: receiving a first request from an external device via an internet, the first request having first port information indicating a first port; in response to receiving the first request, transmitting a first response to the external device via the internet; receiving a second request from the external device via the internet, the second request having second port information indicating a second port; in response to receiving the second request, transmitting a second response to the external device via the internet; after transmitting the first response and the second response, receiving result information from the external device via the internet, the result information being based on a fact that the external apparatus receives the first request and the second request; and performing an addressing process on a basis of the result information, the addressing process being for addressing a security issue concerning the first port and the second port.

According to another aspect, the disclosure provides a non-transitory computer readable storage medium storing a set of program instructions for a communication apparatus. The set of program instructions includes: receiving a first request from an external device via an internet, the first request having first port information indicating a first port; in response to receiving the first request, transmitting a first response to the external device via the internet; receiving a second request from the external device via the internet, the second request having second port information indicating a second port; in response to receiving the second request, transmitting a second response to the external device via the internet; after transmitting the first response and the second response, receiving result information from the external device via the internet, the result information being based on a fact that the external apparatus receives the first request and the second request; and performing an addressing process on a basis of the result information, the addressing process being for addressing a security issue concerning the first port and the second port.

According to still another aspect, the disclosure provides an information processing apparatus. The information processing apparatus includes a processor configured to perform: transmitting a first request to a communication apparatus via an internet, the first request having first port information indicating a first port; receiving a first response as a response to the first request from the communication apparatus via the internet; transmitting a second request to the communication apparatus via the internet, the second request having second port information indicating a second port; receiving a second response as a response to the second request from the communication apparatus via the internet; generating result information on the basis of receiving the first request and the second request; and transmitting the generated result information to the communication apparatus via the internet.

BRIEF DESCRIPTION OF THE DRAWINGS

The particular features and advantages of the disclosure as well as other objects will become apparent from the following description taken in connection with the accompanying drawings, in which:

FIG. 2 is an explanatory diagram illustrating a port forwarding configuration table according to the embodiment;

FIGS. 4(A) and 4(B) are explanatory diagrams illustrating diagnostics requests;

FIG. 4(C) is an explanatory diagram illustrating an LPR connection request;

FIG. 4(D) is an explanatory diagram illustrating a RAW connection request;

FIG. 4(E) is an explanatory diagram illustrating an SNMP request;

FIGS. 4(F) and 4(G) are explanatory diagrams illustrating diagnostics results responses;

FIG. 9(A) is an explanatory diagram illustrating an LPR connection request;

FIGS. 9(B) and 9(C) are explanatory diagrams illustrating LPR responses;

FIG. 9(D) is an explanatory diagram illustrating a RAW connection request;

FIGS. 9(E) and 9(F) are explanatory diagrams illustrating RAW responses;

FIG. 12 is a fifth sequence diagram for the settings diagnostic process in a case where a non-recommended configuration is set.

DETAILED DESCRIPTION

A. Embodiment

A-1: Structure of a System 1000

Figure 1:
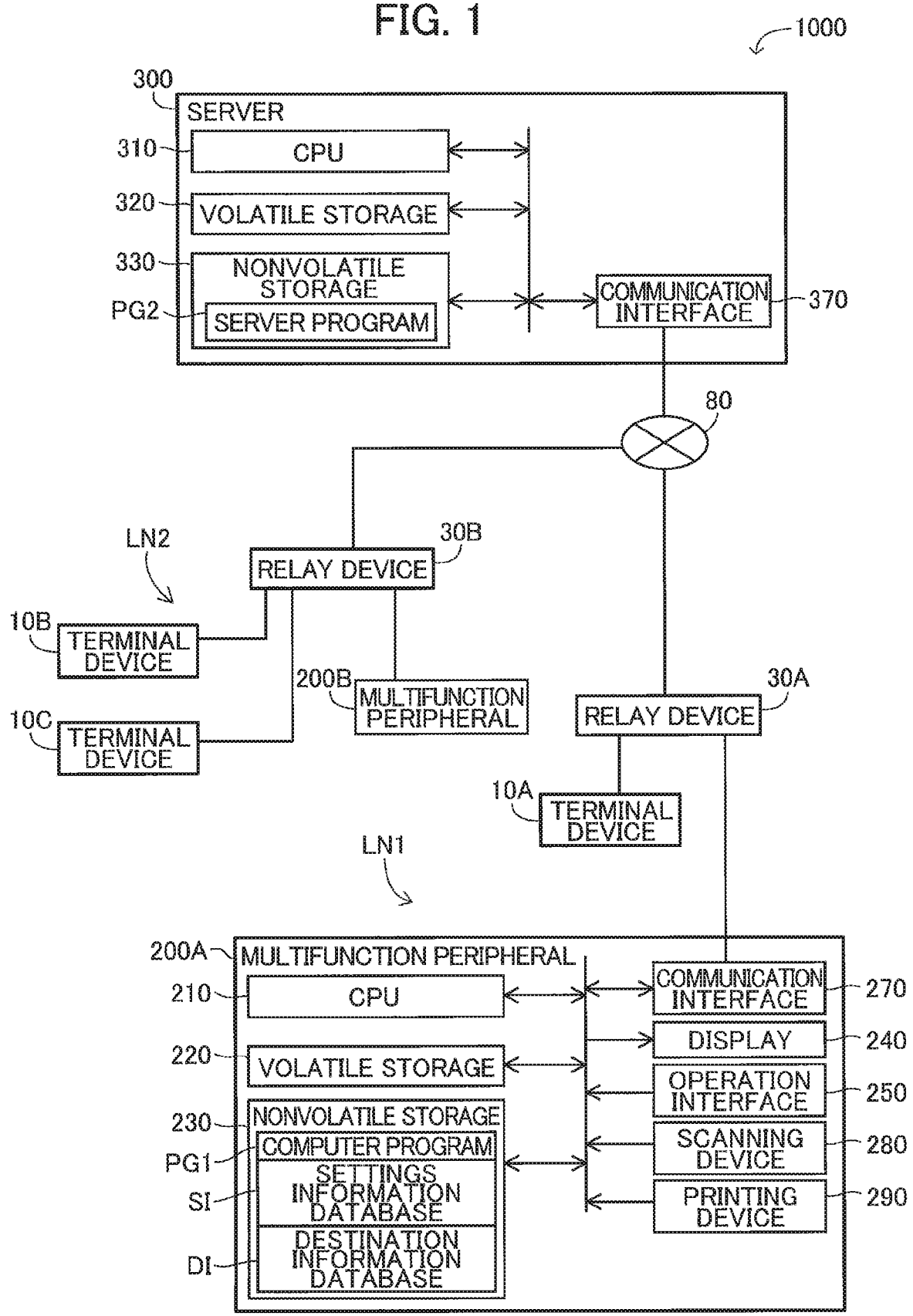
FIG. 1 is a block diagram illustrating a structure of a system according to an embodiment.

An embodiment will be described while referring to the accompanying drawings. FIG. 1 is a block diagram showing the structure of a system 1000.

The system 1000 includes multifunction peripherals (MFP) 200A and 200B as examples of communication apparatuses, terminal devices 10A-10C, a server 300, and relay devices 30A and 30B. The MFP 200A and the terminal device 10A are connected to a local area network LN1. The MFP 200B and the terminal devices 10B and 10C are connected to a local area network LN2. The local area network LN1 is connected to an internet 80 via the relay device 30A. The local area network LN2 is connected to the internet 80 via the relay device 30B. The server 300 is also connected to the internet 80. Thus, the MFP 200A is connected to the terminal device 10A via the local area network LN1 and is connected to the server 300 via the local area network LN1 and the internet 80.

The MFP 200A includes a CPU 210 serving as the controller of the MFP 200A; a volatile storage 220, such as RAM; a nonvolatile storage 230, such as a hard disk drive or flash memory; a display 240, such as a liquid crystal display; an operation interface 250, such as a touchscreen laid over a liquid crystal panel, buttons, and the like; a communication interface 270; a scanning device 280; and a printing device 290.

The scanning device 280 includes a photoelectric transducer configured of a CCD or CMOS image sensor to optically read a document or other object. The scanning device 280 generates scan data representing the image read by the photoelectric transducer. The printing device 290 prints images on papers (an example of the printing medium) according to a prescribed method (laser method or inkjet method, for example).

The volatile storage 220 provides a buffer region for temporarily storing various intermediate data that is generated when the CPU 210 executes processes. The nonvolatile storage 230 stores a computer program PG1, a settings information database SI, and a destination information database DI. The volatile storage 220 and the nonvolatile storage 230 are internal memory of the MFP 200A.

The computer program PG1 may be pre-stored in the nonvolatile storage 230 when the MFP 200A is manufactured. Alternatively, the computer program PG1 may be stored and provided on a CD-ROM or other media or may be made available for download from a server connected over the Internet.

The CPU 210 controls the MFP 200A by executing the computer program PG1. For example, the CPU 210 executes a printing process, a scanning process, or a facsimile process according to a user command. A printing process controls the printing device 290 to print an image. A scanning process controls the scanning device 280 to optically read an object and generate scan data. A facsimile process includes either a process to transmit scan data generated through a scanning process over a telephone line as fax data, or a process to control the printing device 290 to print an image based on fax data received over a telephone line.

The CPU 210 can also execute various server functions related to these control processes by executing the computer program PG1. Server functions enable the CPU 210 to provide various services with the MFP 200A functioning (acting or serving) as a server and an apparatus connected to the MFP 200A via a network (the terminal device 10A operated by a user, for example) functioning (acting or serving) as a client. For printing processes, for example, the CPU 210 receives a print job from a client using the LPR (Line Printer Remote, or Line Printer Daemon) protocol or the RAW protocol and provides a printing service. For scanning processes, the CPU 210 provides a scanning service by generating and transmitting scan data to a client over a network (the local area network LN1, for example). In the embodiment, the scanning service is executed according to a proprietary protocol provided by the manufacturer of the MFP 200A. The CPU 210 also provides an information provision service for transmitting information about the MFP 200A, such as settings information stored in the settings information database SI or status information indicating the status of the MFP 200A in response to a request from a client. The information provision service is performed using the Simple Network Management Protocol (SNMP). The CPU 210 also provides a settings management service for providing a settings screen to a client as a web page that allows the client to acquire and modify settings information related to the MFP 200A that is stored in the settings information database SI. The settings management service is performed using the Hypertext Transfer Protocol (HTTP). For these services, it should be noted that the Internet Protocol (IP) is used as the protocol in the network layer of the OSI model. Further, the Transmission Control Protocol (TCP) is used as the protocol in the transport layer of the OSI model for each of these services, excluding the information provision service. In the information provision service, the User Datagram Protocol (UDP) is used as the protocol in the transport layer of the OSI model.

In order to avoid complicating the following description, the CPU 210 will be described as providing only a printing service using the LPR protocol (hereinafter also called an "LPR printing service"), a printing service using the RAW protocol (hereinafter also called a "RAW printing service"), and an information provision service using SNMP. Note that port number P_lpr of the MFP 200A will correspond to the LPR printing service, port number P_raw of the MFP 200A will correspond to the RAW printing service, and port number P_snmp of the MFP 200A will correspond to the information provision service using SNMP.

The services of the MFP 200A are intended to be provided to client devices on the local area network LN1, and specifically to the terminal device 10A in this example and are not intended to be provided to external apparatuses over the internet 80. Therefore, from a security standpoint it is preferable that devices outside the local area network LN1 not be able to receive these services from the MFP 200A over the internet 80.

The settings information database SI stores various settings information related to the MFP 200A, such as settings information related to image processes, the network, the display 240, and the operation interface 250.

Settings information related to image processes includes settings information related to printing processes and settings information related to scanning processes. The settings information related to image processes may include personal information. For example, the settings information related to scanning processes includes a scan profile, which is information constituting a group of values of settings for a plurality of scanning processes. The scan profile includes the scanning resolution and number of colors (monochrome, full color, etc.) for the scan data being generated, as well as personal information such as the email address specifying the destination of the generated scan data.

Settings information for the network includes the IP address assigned to the MFP 200A, and general settings information for communications conforming to TCP/IP, such as information specifying the subnet mask and the default gateway. By specifying an external storage server (not shown) connected to the MFP 200A over the internet 80 as the destination for scan data, the MFP 200A can store scan data on the storage server. Settings information related to the network also includes information for communicating with the external storage server (the URL of the external server, for example), and information specifying whether communication with the external server is allowed.

The destination information database DI includes destination information for a facsimile process, such as the fax number to which fax data is to be transmitted, or an email address as the destination for the scan data, for example.

The communication interface 270 is for performing data communications with external apparatuses. In the embodiment, the communication interface 270 includes an interface for connecting to the local area network LN1, and specifically a wired and/or wireless interface conforming to Ethernet (registered trademark) and Wi-Fi specifications.

The structure of the MFP 200B is identical to that of the MFP 200A described above.

The server 300 is provided by the manufacturer of the MFPs 200A and 200B. The server 300 is provided with a CPU 310 as the controller of the server 300; a volatile storage 320, such as RAM; a nonvolatile storage 330, such as a hard disk drive; and a communication interface 370 for connecting to the internet 80.

The volatile storage 320 provides a buffer region for temporarily storing various intermediate data generated when the CPU 310 performs processes. The nonvolatile storage 330 stores a server program PG2. By executing the server program PG2, the CPU 310 implements a settings diagnostic process (described later) in conjunction with the MFPs 200A and 200B.

In the settings diagnostic process described later, it will be assumed that the MFPs 200A and 200B transmit an HTTP request to the server 300 via the internet 80. For this reason, a global IP address GIP_S is assigned to the server 300.

The terminal devices 10A-10C are well known computers, such as personal computers or smartphones. The terminal device 10A can communicate with the MFP 200A through the local area network LN1 in order to use the MFP 200A. For example, the terminal device 10A can use the LPR printing service or the RAW printing service of the MFP 200A. Through these services, the terminal device 10A can control the MFP 200A to execute a printing operation by simply transmitting a print job to the MFP 200A. The terminal devices O1B and 10C can similarly use the MFP 200B via the local area network LN2.

The relay device 30A can function as a hub, a router, and a data circuit-terminating unit. The hub function relays communications between devices on the local area network LN1, such as the terminal device 10A and the MFP 200A. The router function relays communications between devices on the local area network LN1 and devices on another network, such as the internet 80. The data circuit-terminating unit function converts between signals used on the local area network LN1, such as Ethernet signals, and signals used for communications between the relay device 30A and an Internet service provider, such as optical and ADSL signals. The data circuit-terminating unit is an optical network unit (ONU) in the case of an optical line, and a modem in the case of an ADSL line. While the functions for a hub, a router, and a data circuit-terminating unit are all implemented by a single device in the embodiment (the relay device 30A in this example), these functions may be implemented by two or more devices.

A-2. Network Settings

Under the recommended network settings (hereinafter called the "recommended configuration"), a global IP address is assigned to the relay device 30A (the router), and local IP addresses (also called "private IP addresses") are assigned to devices on the local area network LN1, such as the terminal device 10A and the MFP 200A. Global IP addresses are unique IP addresses not duplicated among devices on the Internet and are used for communicating over the internet 80. Local IP addresses are used for communications within a local area network and should not be duplicated among devices on the same local area network. In this example, the local IP address LIP_M is assigned to the MFP 200A and the global IP address GIP_M is assigned to the relay device 30A in the recommended configuration.

Under the recommended configuration, the relay device 30A implements an address translation function for converting address information called network address port translation (NAPT). As the address translation function, the relay device 30A executes a source IP address translation process when relaying a request from the local area network LN1 to the internet 80 for example, and a destination address translation process when relaying a response from the internet 80 to the local area network LN1 for example. For example, the MFP 200A on the local area network LN1 may transmit a request (such as a request concerning the LPR printing service) to an external apparatus on the internet 80 via the relay device 30A, and may receive a response to the request from the external apparatus. When relaying a request transmitted from the MFP 200A to an external apparatus, the relay device 30A modifies the source IP address in the request from the local IP address LIP_M of the MFP 200A to the global IP address GIP_M for the relay device 30A (the source IP address translation process). At this time, the relay device 30A register a record for the IP address in a modification history. When relaying a response from an external apparatus to the MFP 200A, the relay device 30A references the recorded modification history and changes the destination IP address in the response from the global IP address GIP_M for the relay device 30A to the local IP address LIP_M for the MFP 200A (the destination IP address translation process). The relay device 30A deletes the modification history referenced in this process after the response has been relayed. The source IP address translation process may be performed for a response transmitted from the MFP 200A to an external apparatus.

Port forwarding is another well-known function of routers. The port forwarding function serves to transmit a request received by the router (the relay device 30A, for example) to a preregistered specific device (the MFP 200A, for example) when the destination port number in the request matches a preregistered special port number. The port forwarding function is not enabled in the recommended configuration.

Under the recommended configuration, data cannot be transmitted from an external apparatus to the MFP 200A in general unless a request is first transmitted from the MFP 200A to the external apparatus and the modification history of the IP address for this request is recorded on the relay device 30A. Therefore, while the MFP 200A can initially transmit a request to an external apparatus when the MFP 200A functions as a client and the external apparatus functions as a server, the external apparatus cannot transmit a request initially to the MFP 200A when the MFP 200A functions as a server and the external apparatus functions as a client. Thus, under the recommended configuration, an external apparatus belonging to a third party (a malicious hacker, for example) will have difficulty transmitting a request or the like to the MFP 200A over the internet 80, even when knowing the global IP address of the relay device 30A.

Note that ports for the three services provided by the MFP 200A (the LPR printing service, RAW printing service, and information provision service) are all open in the recommended configuration. The ports for these services are normally open to allow the MFP 200A to function as a network printer for communicating over the local area network LN1 without using the internet 80.

In some cases, network settings other than the recommended configuration (hereinafter called a "non-recommended configuration") may be used. Under a non-recommended configuration, an external apparatus can transmit a request to the MFP 200A via the internet 80 when the MFP 200A is functions (or acts) as a server and the external apparatus functions (or acts) as a client. Accordingly, the external apparatus of a third party can more easily transmit requests and the like to the MFP 200A over the internet 80 under a non-recommended configuration than under the recommended configuration. So, there is greater potential for a third party to tamper with settings information in the settings information database SI of the MFP 200A or to gain access to destination information in the destination information database DI over the internet 80, for example. Hence, the security level under a non-recommended configuration is lower than that under the recommended configuration and may give rise to security issues. Such a non-recommended configuration might be employed when the administrator of the MFP 200A has insufficient knowledge of security issues, for example.

Here, an example of non-recommended configurations will be described. A non-recommended configuration A is identical to the recommended configuration described above, except that the port forwarding function defined in a port forwarding configuration table FT described below has been enabled.

FIG. 2 shows an example of the port forwarding configuration table FT stored in the relay device 30A. The port forwarding configuration table FT stores correlations that associate a target IP address and a target port number with a forwarding destination IP address. When the relay device 30A receives a request (a request for the LPR printing service or the RAW printing service, for example) from an external apparatus via the internet 80 while the port forwarding function is enabled, the relay device 30A extracts the destination IP address and the destination port number from this request. The relay device 30A determines whether the destination IP address in the request matches a target IP address set in the port forwarding configuration table FT and whether the destination port number in the request matches a target port number which is associated with the target IP address in the port forwarding configuration table FT. If the destination IP address matches a target IP address and the destination port number matches a corresponding target port number, the relay device 30A converts the destination IP address in the request to the forwarding destination IP address which is associated with the target port number in the port forwarding configuration table FT. Next, the relay device 30A forwards this converted request by routing the request to the forwarding destination IP address. As a result, the request is transmitted to a device that has been assigned with the forwarding destination IP address. Using the example in FIG. 2, if a request having "GIP_M" as the destination IP address and port number "P_lpr" for the LPR printing service as the destination port number (i.e., the request for the LPR printing service) is transmitted to the relay device 30A over the internet 80, the relay device 30A relays this request to the MFP 200A assigned with the local IP address LIP_M. Similarly, if a request having GIP_M as the destination IP address and port number P_raw for the raw printing service as the destination port number (i.e., the request for the RAW printing service) is transmitted to the relay device 30A over the internet 80, the relay device 30A relays this request to the MFP 200A that is assigned with the local IP address LIP_M.

The recommended configuration and the non-recommended configurations may similarly be applied to the relay device 30B and the local area network LN2 to which the terminal devices 10B and 10C and MFP 200B are connected.

A-3: Operations of the System 1000

In the embodiment, a settings diagnostic process is performed to determine whether the recommended configuration has been established or whether a non-recommended configuration is being used. The settings diagnostic process is executed by the CPU 210 of the MFP 200A or the MFP 200B and the CPU 310 of the server 300. The followings will explain in a case in which the MFP 200A and the server 300 execute the settings diagnostic process, but a process executed by the MFP 200B and the server 300 is similar. In the embodiment, the settings diagnostic process is executed when the power to the MFP 200A is turned on. Here, executing the settings diagnostic process when the power to the MFP 200A is turned on signifies that the CPU 210 begins executing the settings diagnostic process as part of a series of processes that the CPU 210 automatically executes when the power to the MFP 200A is turned on. The automated processes include processes for starting up the operating system (OS) and/or the file system.

A-3-1: Operations Performed under the Recommended Configuration

Figure 3:
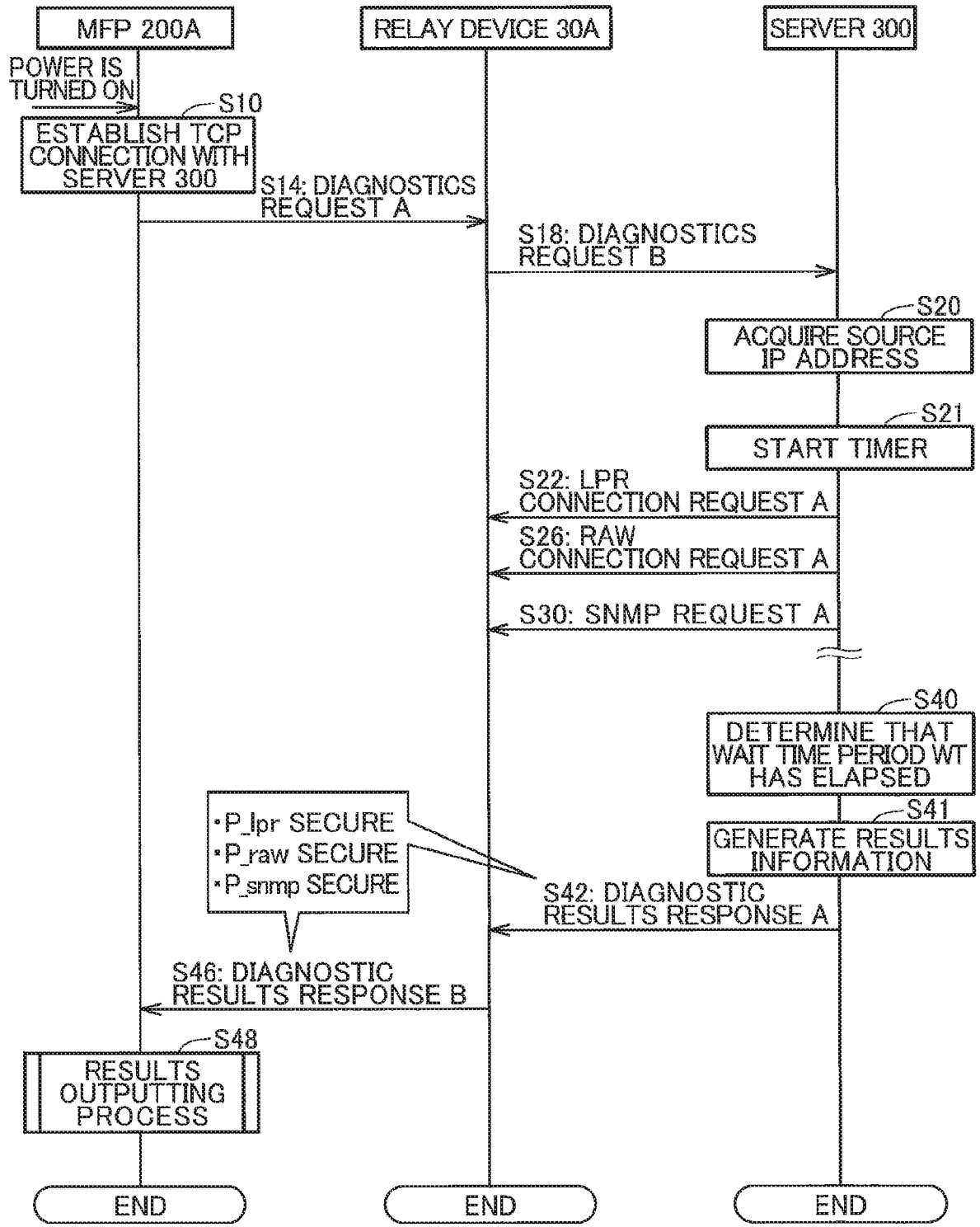
FIG. 3 is a first sequence diagram for a settings diagnostic process in a case where a recommended configuration is set.

FIG. 3 is a first sequence diagram for the settings diagnostic process. The first sequence diagram shows the sequence of operations performed when the recommended configuration has been set.

When the power to the MFP 200A is turned on, in S10 of FIG. 3 the MFP 200A (the CPU 210) establishes a connection with the server 300 in conformance with TCP (hereinafter called a "TCP connection"). Specifically, the MFP 200A acquires a uniform resource locator (URL) from the nonvolatile storage 230. Here, the manufacturer of the MFP 200A stored this URL in the nonvolatile storage 230 in advance. The URL includes character strings having a domain name, directory name, and file name. The directory name and the file name follow the domain name in the URL. Next, the MFP 200A acquires the global IP address corresponding to the domain name included in the URL from a domain name system (DNS) server on the internet 80. The global IP address acquired in this example is the address "GIP_S" for the server 300. The MFP 200A uses this global IP address to establish a TCP connection with the server 300.

Through steps S14 and S18 of FIG. 3, the MFP 200A transmits a diagnostics request using the TCP connection established with the server 300. Specifically, in S14 the MFP 200A (and more specifically the CPU 210) transmits a diagnostics request A over the local area network LN1. This diagnostics request may be a request conforming to HTTP (an HTTP request), for example. The relay device 30A receives the diagnostics request A.

FIGS. 4(A)-4(G) are request-response explanatory diagrams showing examples of requests and responses used in the settings diagnostic process. As shown in FIG. 4(A), an IP header of the diagnostics request A transmitted in S14 includes a source IP address LIP_M, a destination IP address GIP_S, a source port number P_mfp, a destination port number P_html. The source IP address LIP_M is the local IP address of the multifunction peripheral 200A. The destination IP address GIP_S is the global IP address of the server 300 acquired from the DNS server as described above. The source port number P_mfp is port number of the MFP 200A set for the settings diagnostic process. The destination port number P_html is port number of the server 300 set for the settings diagnostic process. A body of diagnostics request A includes destination information. The destination information has values following the domain name (the directory name and the filename, for example) in the URL prestored on the nonvolatile storage 230, as described above. The destination information specifies the settings diagnostic service provided by the server 300. The destination port number P_html is prestored on the nonvolatile storage 230 by the manufacturer of the MFP 200A.

In the recommended configuration, the address translation function of the relay device 30A is enabled. Hence, in response to receiving diagnostics request A, the relay device 30A executes the source IP address translation process, as described above. That is, the relay device 30A converts the source IP address in the IP header of diagnostics request A to the global IP address GIP_M of the relay device 30A. The relay device 30A also registers a modification record of the IP address modification together with the source port number P_mfp in the modification history.

In S18 the relay device 30A transmits a diagnostics request B (see FIG. 4(B)), obtained by modifying the source IP address in the diagnostics request A to the global IP address GIP_M of the relay device 30A, over the internet 80. The server 300 receives the diagnostics request B via the internet 80.

In S20 the server 300 (and specifically the CPU 310) extracts the source IP address included in the IP header of the diagnostics request B received from the relay device 30A. When using the recommended configuration, the server 300 acquires the global IP address GIP_M for the relay device 30A, as illustrated in FIG. 4(B).

In S21 the server 300 starts a timer for counting a prescribed wait time period WT. The wait time period WT is a period of just a few seconds, for example.

In S22, S26, and S30 the server 300 transmits multiple requests to the MFP 200A in order to determine (or examine) the network settings on the MFP 200A. The server 300 as functioning a client transmits to the MFP 200A these requests for services provided by the MFP 200A. In the embodiment, the server 300 transmits requests for using each of the three services described above (the LPR printing service, the RAW printing service, and the information provision service).

Specifically, in S22 the server 300 transmits an LPR connection request A (see FIG. 4(C)) over the internet 80 requesting provision of the LPR printing service. More specifically, this LPR connection request A is a request to establish a connection (TCP connection, for example) for exchanging print jobs and commands needed for the LPR printing service. As shown in FIG. 4(C), an IP header of the LPR connection request A includes a source IP address GIP_S, a destination IP address GIP_M, a source port number P_sev, a destination port number P_lpr. The source IP address GIP_S is the global IP address of the server 300. The destination IP address GIP_M is the global IP address acquired in S20, and specifically the global IP address of the relay device 30A. The source port number P_sev is port number of the server 300 for determining (or examining) network settings. The destination port number P_lpr is port number of the MFP 200A for the LPR printing service described above.

In S26 the server 300 transmits a RAW connection request A (see FIG. 4(D)) over the internet 80 requesting provision of the RAW printing service. Specifically, this RAW connection request is a request to establish a connection (TCP connection, for example) for exchanging print jobs and commands required for the RAW printing service. As shown in FIG. 4(D), an IP header of the RAW connection request A includes a source IP address GIP_S, a destination IP address GIP_M, a source port number P_sev, a destination port number P_raw. Here, the source IP address GIP_S, the destination IP address GIP_M, and the source port number P_sev are the same as those in the LPR connection request A of FIG. 4(C). The destination port number P_raw is port number of the MFP 200A for the RAW printing service described above.

In S30 the server 300 transmits an SNMP request A (see FIG. 4(E)) over the internet 80 requesting provision of the information provision service. As shown in FIG. 4(E), an IP header of the SNMP connection request A includes a source IP address GIP_S, a destination IP address GIP_M, a source port number P_sev, a destination port number P_snmp. Here, the source IP address GIP_S, the destination IP address GIP_M, and the source port number P_sev are identical to those in the LPR connection request A of FIG. 4(C). The destination port number P_snmp is port number of the MFP 200A for the information provision service described above.

When the relay device 30A receives the LPR connection request A under the recommended configuration, the relay device 30A confirms that the destination IP address is set to the relay device 30A (GIP_M), but the relay device 30A has no record of a modification performed in the source IP address translation process for a request whose source port number is P_lpr. Therefore, the relay device 30A discards the LPR connection request A without performing the destination IP address translation process and without transmitting the LPR connection request A to another device. Accordingly, an LPR connection request does not reach the MFP 200A.

Similarly, when the relay device 30A receives each of the RAW connection request A and the SNMP request A under the recommended configuration, the relay device 30A does not perform a destination IP address translation process since there are no records in the modification history indicating that the source IP address translation process is performed on request whose source port number is the port number P_raw or the port number P_snmp. Therefore, the relay device 30A discards these requests without transmitting them to other devices. Accordingly, a RAW connection request A and a SNMP request do not reach the MFP 200A.

Through this process, none of the LPR connection request, the RAW connection request, and the SNMP request reaches the MFP 200A under the recommended configuration. Accordingly, the MFP 200A can transmit none of responses to the LPR connection request A, the RAW connection request A, and the SNMP request A. Therefore, the server 300 receives none of responses to the LPR connection request A, the RAW connection request A, and the SNMP request A. Accordingly, under the recommended configuration, the wait time period WT elapses without the server 300 receiving a response to any of the LPR connection request A, the RAW connection request A, and the SNMP request A.

Once the wait time period WT has elapsed, in S40 the server 300 determines that the wait time period WT has elapsed on the basis of the count in the timer that was started in S21. In this case, the server 300 can determine that the ports corresponding to the three services described above, i.e., the ports having port numbers P_lpr, P_raw, and P_snmp, are not publicly available on the internet 80 and are ports with no security issues (hereinafter called "secure ports"). Ports that are publicly available on the internet 80 and, thus, have security issues will be called "vulnerable ports."

In S41 the server 300 generates results information specifying the diagnostic results for the port numbers P_lpr, P_raw, and P_snmp. The results information specifies whether each of the three ports has security issues or not, i.e., whether each is a secure port or a vulnerable port. In the example of FIG. 3, the server 300 generates results information specifying that all three ports are secure ports.

In S42 and S46, diagnostic results responses A and B that include results information are transmitted from the server 300 to the MFP 200A using the TCP connection established in S10. Specifically, in S42 the server 300 transmits a diagnostic results response A (see FIG. 4(F)) whose body includes the results information generated in S41 over the internet 80 as a response to the diagnostics request B received in S18. As shown in FIG. 4(F), an IP header of the diagnostic results response A includes a source IP address GIP_S, a destination IP address GIP_M, a source port number P_html, and a destination port number P_mfp. The source IP address GIP_S is the global IP address of the server 300. The destination IP address GIP_M is the global IP address acquired in S20, and specifically the global IP address of the relay device 30A. The source port number P_html is port number of the server 300 set for the settings diagnostic process. The destination port number P_mfp is port number of the MFP 200A set for the settings diagnostic process. The relay device 30A receives the diagnostic results response A over the internet 80.

In response to receiving the diagnostic results response A, the relay device 30A executes a process to convert the destination IP address, as described above. That is, a modification history has the modification record at the timing that the relay device 30A receives diagnostic results response A. This modification record was recorded in the modification history by the relay device 30A during a source IP address translation process performed when transmitting the diagnostics request B in S18 after receiving diagnostics request A in S14. The modification record indicates that the relay device 30A performed the source IP address translation process on a request whose destination IP address was the global IP address GIP_S of the server 300 and whose destination port number was port number P_html matching the source port number in the diagnostic results response A. Accordingly, a response whose source IP address is the global IP address GIP_S of the server 300 and whose source port number is port number P_html is the subject of the modification. Therefore, the relay device 30A converts the destination IP address in the IP header of diagnostic results response A to the local IP address LIP_M of the MFP 200A from the global IP address GIM_M by referencing the modification record. Subsequently, the relay device 30A deletes the referenced modification record.

In S46 the relay device 30A transmits a diagnostic results response B (see FIG. 4(G)), obtained by modifying the destination IP address in diagnostic results response A, over the local area network LN1. The MFP 200A receives the diagnostic results response B via the local area network LN1.

As is clear from the above description, the transmission/reception of diagnostics requests A and B in S14 and S18 and the transmission/reception of diagnostic results responses A and B in S42 and S46 are performed using a TCP connection established with the MFP 200A functioning as a client and the server 300 functioning as a server. Further, the server 300 transmits the LPR connection request A, the RAW connection request A, and the SNMP request A in S22, S26, and S30 while the server 300 functions as a client.

In response to receiving diagnostic results response B, in S48 the MFP 200A executes a results outputting process. The results outputting process is performed to output diagnostic results based on the diagnostic results response B.

Figure 5:
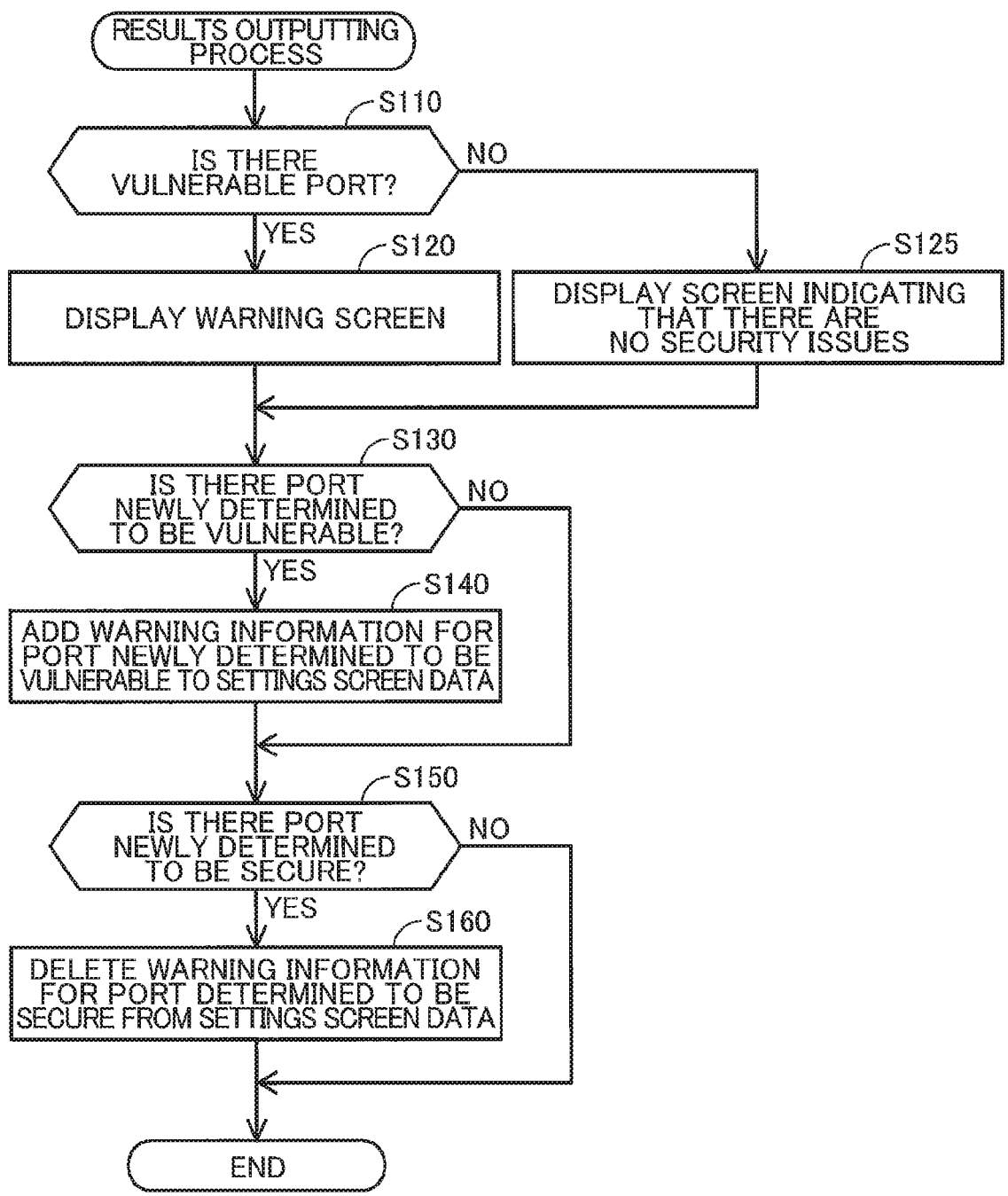
FIG. 5 is a flowchart illustrating a results outputting process.

FIG. 5 is a flowchart illustrating steps in the results outputting process. In S110 the CPU 210 of the MFP 200A determines whether any one of the three ports subjected to diagnostics was determined to be open to the public and, thus, a port with security issues (a vulnerable port). In the example of FIG. 3, the results information included in diagnostic results response B that the MFP 200A received in S46 indicates that all three ports subjected to diagnostics are secure ports. Accordingly, in the example of FIG. 3 the MFP 200A determines that none of the three ports were found to be a vulnerable port.

Figure 6:
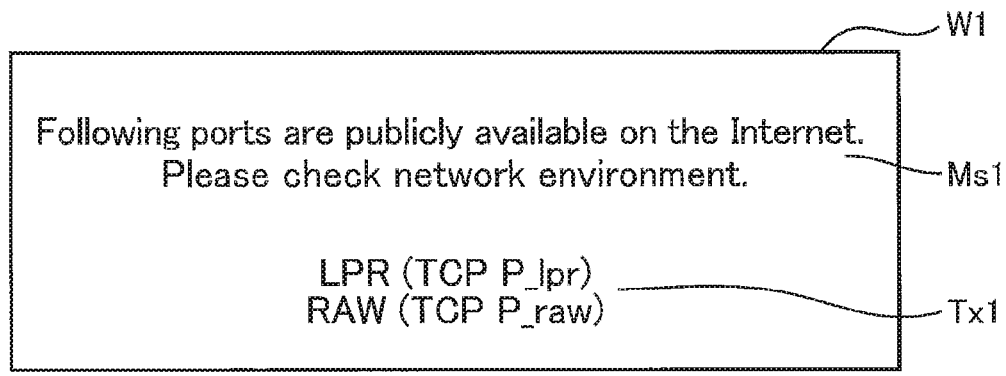
FIGS. 6(A)-6(C) are explanatory diagrams illustrating warning screens.
Figure 6:
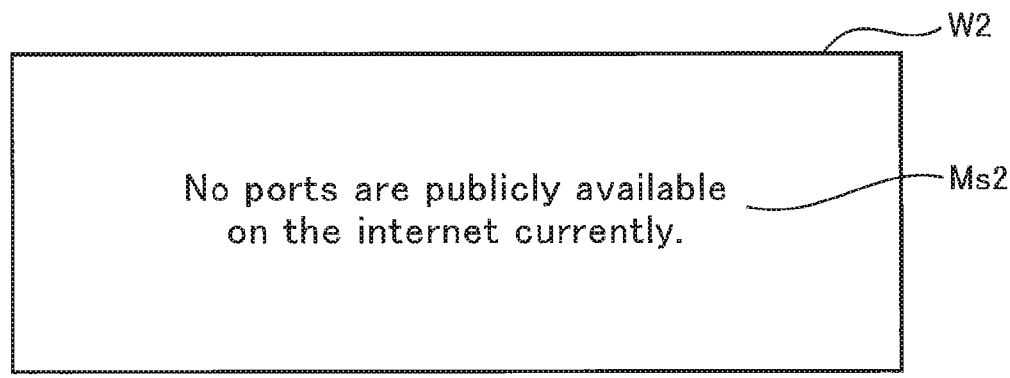
Figure 6:
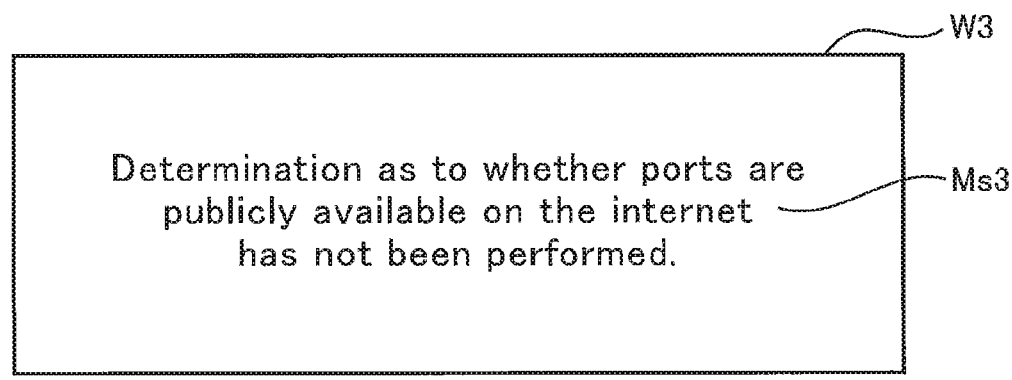

When there exists a port determined to be a vulnerable port (S110: YES), in S120 the CPU 210 displays a warning screen WI on the display 240 specifying the vulnerable port(s). FIGS. 6(A)-6(B) show examples of screens displayed on the display 240. FIG. 6(A) shows an example of the warning screen W1. This warning screen W1 includes text Tx1 specifying the vulnerable ports, and a message Ms1 indicating that there is a security issue with the vulnerable ports specified in the text Tx1.

If the CPU 210 determines that no ports were found to be vulnerable (S110: NO), in S125 the CPU 210 displays a screen W2 on the display 240 indicating that there are no vulnerable ports and no security issues. FIG. 6(B) shows an example of the screen W2. This screen W2 includes a message Ms2 specifying that there are no vulnerable ports and, hence, no security issues.

In S130 the CPU 210 determines whether there exist any ports newly determined to be vulnerable. Specifically, the CPU 210 determines that a port has been newly determined to be vulnerable when there is at least one of the ports which is found to be secure in the results information included in the diagnostic results response received in the previous settings diagnostic process, but is a vulnerable port in the results information included in the diagnostic results response received in the current settings diagnostic process.

If there exist any ports newly determined to be vulnerable (S130: YES), in S140 the CPU 210 adds warning information for the ports newly determined to be vulnerable to settings screen data. The settings screen data is data (HTML data, for example) representing a settings screen provided as a web page by the settings management service described above. In a case where the current settings diagnostic process is firstly performed and YES determination is made in S110, in S130 of the firstly performed settings diagnostic process the CPU 210 may make YES determination.

Figure 7:
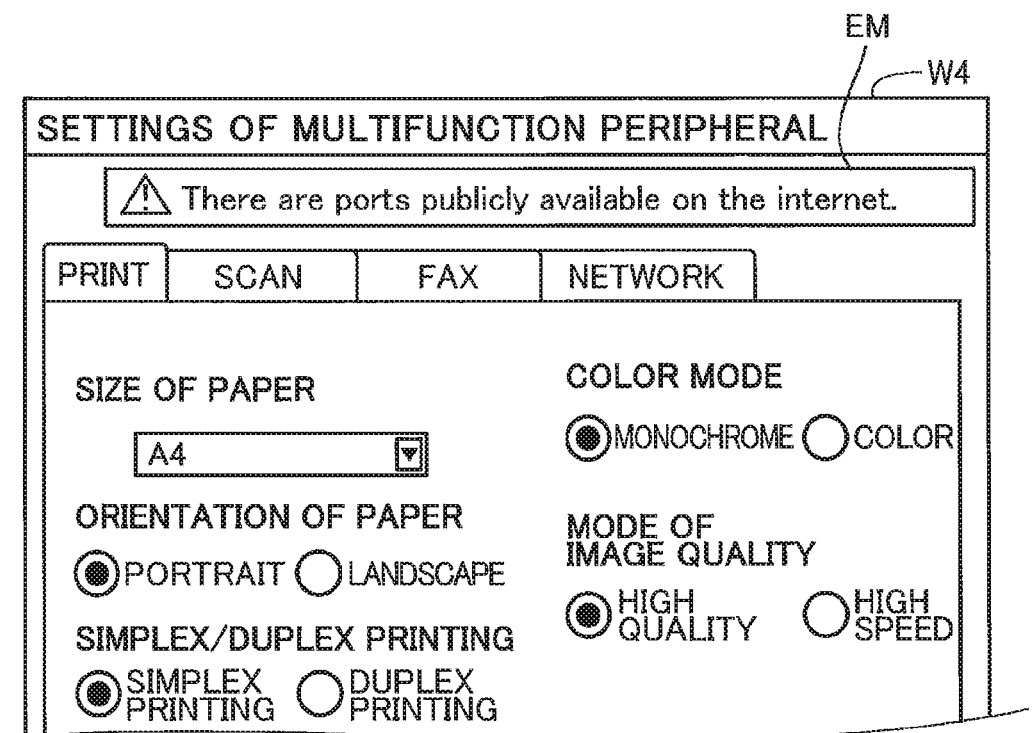
FIG. 7 is an explanatory diagram illustrating a settings screen.

FIG. 7 shows an example of a settings screen W4 represented by the settings screen data. The settings screen data representing this settings screen W4 is transmitted to the client (the terminal device 10A, for example) using the settings management service of the MFP 200A in response to a request from the client. The client displays the settings screen W4 represented by the settings screen data on a display. As shown in FIG. 7, the settings screen W4 includes a user interface for acquiring and modifying various settings information, such as settings information related to a printing process or a scanning process. The settings screen W4 in FIG. 7 includes a warning EM indicating that there are vulnerable ports. When the user clicks on the warning EM, for example, additional information (not shown) on the vulnerable ports (the port numbers, for example) is displayed. The warning information added to the settings screen data in S140 includes information representing the warning EM and information on the vulnerable ports that will be displayed when the user clicks on the warning EM.

If the CPU 210 determines in S130 that there are no ports newly found to be vulnerable (S130: NO), the CPU 210 skips S140.

In S150 the CPU 210 determines whether there exist any ports newly determined to be secure. Specifically, the CPU 210 determines that a port has been newly determined to be secure when there is at least one of the ports which is specified as vulnerable in results information included in the diagnostic results response received in the previous settings diagnostic process, but is specified as a secure port in results information included in the diagnostic results response received in the current settings diagnostic process.

If there are any ports newly determined to be secure (S150: YES), in S160 the CPU 210 deletes the warning information for the ports determined to be secure from the settings screen data. For example, when all ports are found to be secure, the CPU 210 deletes the information representing the warning EM in FIG. 7 and the information to be displayed when the user clicks on the warning EM from the settings screen data. Alternatively, in a case where some of the ports become secure ports while others remain vulnerable, the CPU 210 maintains the information in the settings screen data that represents the warning EM, as well as the information to be displayed when the warning EM is clicked for those ports that remain vulnerable. In this case, the CPU 210 deletes only the information to be displayed when the user clicks on the warning EM for those ports newly determined to be secure. However, if the CPU 210 determines in S150 that no ports were newly determined to be secure (S150: NO), the CPU 210 skips S160.

In the example of FIG. 3, all three ports subjected to diagnostics are specified as secure ports in the diagnostic results response B received by the MFP 200A in S46. Therefore, in the results outputting process of S48 the CPU 210 displays the screen W2 shown in FIG. 6(B) on the display 240 (S110: NO, S125 of FIG. 5). If warning information related to a vulnerable port is still included in the settings screen data at the beginning of this results outputting process, the CPU 210 deletes the warning information at this time (S150: YES, S160 of FIG. 5).

A-3-2: Operations Performed under a Non-recommended Configuration

Figure 8:
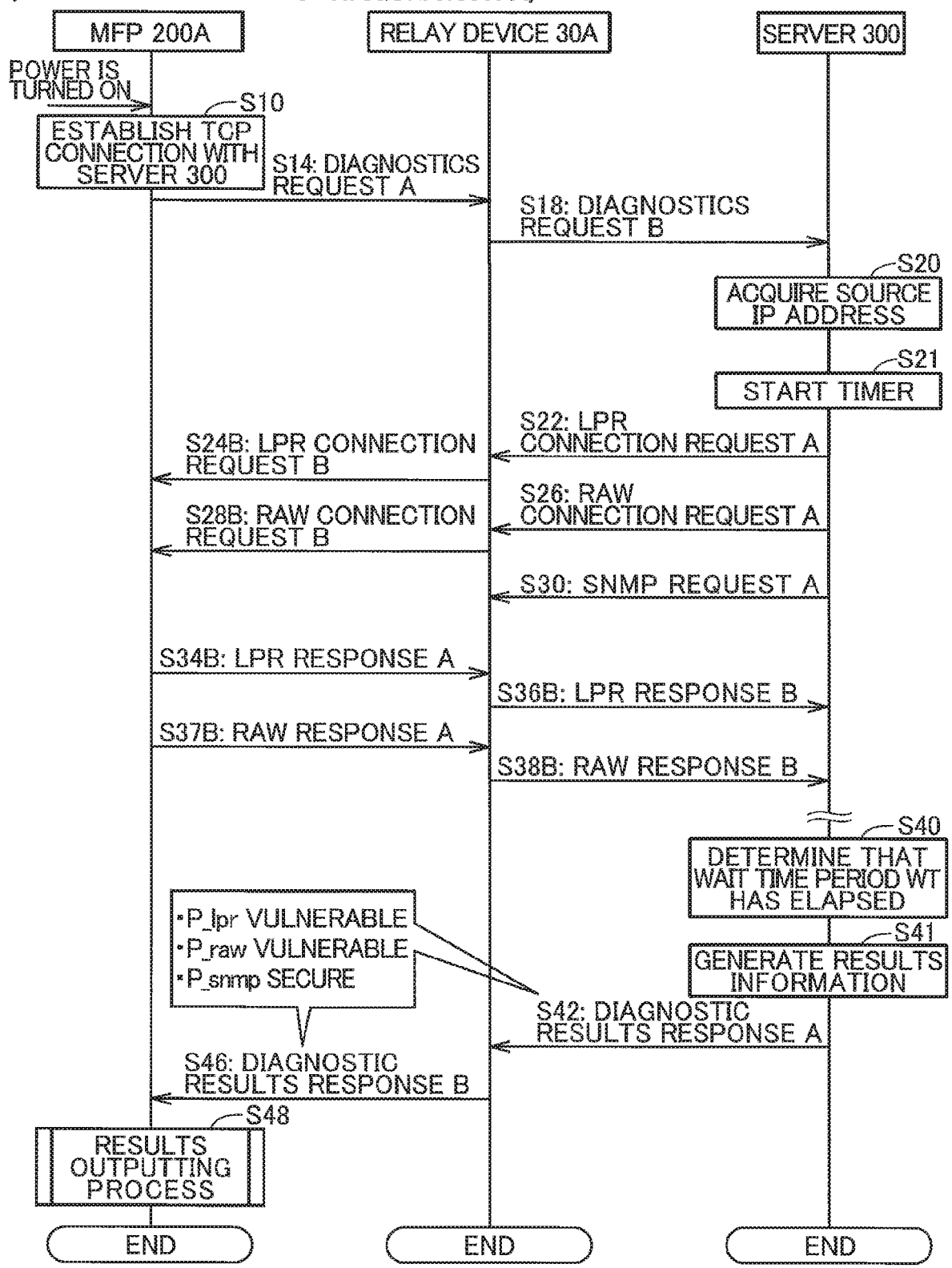
FIG. 8 is a second sequence diagram for the settings diagnostic process in a case where a non-recommended configuration is set.

Next, the settings diagnostic process performed under the non-recommended configuration A described above will be described. FIG. 8 is a second sequence diagram for the settings diagnostic process. The second sequence diagram shows the sequence of steps performed when the non-recommended configuration A has been established. In FIG. 8, steps identical to those in the process of FIG. 3 are designated with the same step numbers, while steps different from those in the process of FIG. 3 have a "B" appended to the step number. FIGS. 9(A)-9(F) are request-response explanatory diagrams showing examples of requests and responses used in the settings diagnostic process.

Steps S10, S14, S18, S20, S21, S22, S26, and S30 in FIG. 8 are identical to the same steps in FIG. 3. Under the non-recommended configuration A, the port forwarding function is enabled on the relay device 30A based on the port forwarding configuration table FT in FIG. 2. Therefore, when the relay device 30A receives the LPR connection request A (see FIG. 4(C)) in S22, the relay device 30A converts the destination IP address in the LPR connection request A from the global IP address GIP_M to the local IP address LIP_M of the MFP 200A to generate an LPR connection request B shown in FIG. 9(A). In S24B the relay device 30A transmits the LPR connection request B over the local area network LN1, and the MFP 200A receives the LPR connection request B.

Similarly, when the relay device 30A receives the RAW connection request A (see FIG. 4(D)) in S26, the relay device 30A converts the destination IP address in the RAW connection request A from the global IP address GIP_M to the local IP address LIP_M of the MFP 200A to generate a RAW connection request B shown in FIG. 9(D). In S28B the relay device 30A transmits the RAW connection request B over the local area network LN1, and the MFP 200A receives the RAW connection request B. Note that since SNMP request A is not a target of the port forwarding function, SNMP requests do not reach the MFP 200A, as in FIG. 3.

In response to receiving the LPR connection request B in S24B, in S34B the MFP 200A transmits an LPR response A (see FIG. 9(B)) over the local area network LN1. The LPR response A is a response to the LPR connection request B (or A) for the purpose of providing the LPR printing service. As shown in FIG. 9(B), an IP header of the LPR response A transmitted in S34B includes a source IP address LIP_M, a destination IP address GIP_S, a source port number P_lpr, and a destination port number P_sev. The source IP address LIP_M is the local IP address of the MFP 200A. The destination IP address GIP_S is the global IP address of the server 300. The source port number P_lpr is port number of the MFP 200A for the LPR printing service. The destination port number P_sev is port number of the server 300 used for determining (or examining) network settings.

When the LPR response A is received in S34B, the relay device 30A executes the source IP address translation process described above. That is, the relay device 30A converts the source IP address included in the IP header of the LPR response A from the local IP address LIP_M to the global IP address GIP_M of the relay device 30A. In S36B the relay device 30A transmits an LPR response B (see FIG. 9(C)), obtained by converting the source IP address in the LPR response A to the global IP address GIP_M, over the internet 80. The server 300 receives the LPR response B via the internet 80.

In response to receiving the RAW connection request B in S28B, in S37B the MFP 200A transmits a RAW response A (see FIG. 9(E)) over the local area network LN1. The RAW response A is a response to the RAW connection request B (or A) for the purpose of providing the RAW printing service. As shown in FIG. 9(E), an IP header of the RAW response A transmitted in S37B includes a source IP address LIP_M, a destination IP address GIP_S, a source port number P_raw, and a destination port number P_sev. The source IP address LIM_M is the local IP address of the MFP 200A. The destination IP address GIP_S is the global IP address of the server 300. The source port number P_raw is port number of the MFP 200A for the RAW printing service. The destination port number P_sev is port number of the server 300 used for determining (or examining) network settings.

In response to receiving RAW response A in S37B, the relay device 30A executes the source IP address translation process described above. That is, the relay device 30A converts the source IP address included in the IP header of RAW response A from the local IP address LIP_M to the global IP address GIP_M of the relay device 30A. In S38B the relay device 30A transmits a RAW response B (see FIG. 9(F)) over the internet 80. The RAW response B is obtained by modifying the source IP address in RAW response A to the global IP address GIP_M of the relay device 30A. The server 300 receives the RAW response B via the internet 80.

Once the wait time period WT has elapsed, as described in FIG. 3, in S40 the server 300 determines that the wait time period WT has elapsed. Up to this point, the server 300 has received the LPR response B as a response to the LPR connection request A and the RAW response B as a response to the RAW connection request A but has not received a response to the SNMP request A. Hence, in this case the server 300 can determine that ports having port numbers P_lpr and P_raw for the LPR printing service and the RAW printing service, respectively, are vulnerable ports, and can determine that the port having port number P_snmp is a secure port.

In S41 the server 300 generates results information. In the example of FIG. 8, the server 300 generates results information specifying that ports having port numbers P_lpr and P_raw are vulnerable ports while the port having port number P_snmp is a secure port.

In S42, as in FIG. 3, the server 300 transmits a diagnostic results response A (see FIG. 4(F)) that includes this results information over the internet 80 as a response to the diagnostics request B received in S18. In S46, as in FIG. 3, the relay device 30A transmits diagnostic results response B (see FIG. 4(G)) obtained by modifying the destination IP address in the diagnostic results response A over the local area network LN1, and the MFP 200A receives the diagnostic results response B via the local area network LN1. In S48 the MFP 200A executes the results outputting process of FIG. 5.

As described above, transmission/reception of diagnostics requests A and B in S14 and S18 and transmission/reception of diagnostic results responses A and B in S42 and S46 are implemented using a TCP connection established with the MFP 200A serving as a client and the server 300 serving as a server. Further, transmission/reception of the LPR connection request in S22 and S24B and transmission/reception of the LPR response in S34B and S36B are implemented with the server 300 serving as a client and the MFP 200A serving as a server. Transmission/reception of the RAW connection request in S26 and S28B and transmission/reception of the raw response in S37B and S38B are also implemented with the server 300 serving as a client and the MFP 200A serving as a server.

According to the example of FIG. 8, the diagnostic results response B that the MFP 200A receives in S46 specifies ports having port numbers P_lpr and P_raw as vulnerable ports and the port having port number P_snmp as a secure port. Accordingly, the MFP 200A displays the warning screen WI shown in FIG. 6(A) on the display 240 in the results outputting process of S48 (S110: YES, S120 of FIG. 5). If warning information related to ports having port numbers P_lpr and P_raw is not included in the settings screen data at the start of the results outputting process, the MFP 200A adds the warning information to the settings screen data at this time (S130: YES, S140 of FIG. 5).

According to the embodiment described above, the MFP 200A receives from the server 300 (i.e., an external apparatus) via the internet 80 the LPR connection request B (S22, S24B of FIG. 8) whose destination port number specifies port number P_lpr, and transmits the LPR response A (S34B, S36B of FIG. 8) to the server 300 via the internet 80 in response to receiving the LPR connection request B. The MFP 200A receives from the server 300 via the internet 80 the RAW connection request B (S26, S28B of FIG. 8) whose destination port number specifies the port number P_raw, and transmits the RAW response A (S37B, S38B of FIG. 8) to the server 300 via the internet 80 in response to receiving the RAW connection request B. After the MFP 200A transmits the LPR response A and the RAW response A, the MFP 200A receives results information, which is included in the diagnostic results responses A and B, from the server 300 via the internet 80 (S42, S46 of FIG. 8). In the example of FIG. 8, the results information indicates that ports with port numbers P_lpr and P_raw are vulnerable based on the fact that the server 300 received the LPR response B and the RAW response B from the MFP 200A. When the MFP 200A receives the diagnostic results response B, in S48 the MFP 200A executes an addressing process for addressing the security issues for ports having port numbers P_lpr and P_raw based on the results information included in the diagnostic results response B. Specifically, the MFP 200A displays the warning screen WI (see FIG. 6(A)) on the display 240 in S120 of FIG. 5 and adds warning information to the settings screen data in S140. Thus, the MFP 200A can suitably address security issues with ports having port numbers P_lpr and P_raw. Here, it is difficult for the MFP 200A to independently determine whether these ports have security issues. However, in the embodiment, the server 300 can easily determine that ports with port numbers P_lpr and P_raw have security issues when the LPR response B and the RAW response B are received from the MFP 200A. Hence, in response to receiving results information indicating these results, the MFP 200A can execute the addressing process to take suitable steps toward resolving the security issues with these ports.

In the embodiment, the MFP 200A transmits the diagnostics request A to the server 300 over the internet 80 (S14, S16 of FIG. 8). After transmitting the diagnostics request A, the MFP 200A then receives the LPR connection request B (S24B of FIG. 8) and the RAW connection request B (S28B of FIG. 8). Thus, by transmitting the diagnostics request A to the server 300, the MFP 200A can acquire the diagnostic results response B including results information at a desired timing.

In the embodiment, transmission of the diagnostics requests A and B (S14 and S18 of FIG. 8) and reception of the diagnostic results responses A and B as responses to the diagnostics requests A and B (S42 and S46 of FIG. 8) are executed with the MFP 200A serving as a client and the server 300 serving as a server. Reception of the LPR connection requests A and B (S22 and S24B of FIG. 8) and transmission of the LPR responses A and B as responses to the LPR connection requests A and B (S34B and S36B of FIG. 8) are executed with the MFP 200A serving as a server and the server 300 serving as a client. Reception of the RAW connection requests A and B (S26 and S28B of FIG. 8) and transmission of the RAW responses A and B as responses to the RAW connection requests A and B (S37B and S38B of FIG. 8) are executed with the MFP 200A serving as a server and the server 300 serving as a client. Thus, since the server 300 and the MFP 200A can implement suitable communications for diagnosing the network settings of the MFP 200A, the MFP 200A can acquire the diagnostic results response B that includes suitable results information.

In the embodiment, transmission of the diagnostics requests A and B (S14 and S18 of FIG. 8) and reception of the diagnostic results responses A and B as responses to the diagnostics requests A and B (S42 and S46 of FIG. 8) are executed using the TCP connection established between the MFP 200A and the server 300. Thus, since the server 300 and the MFP 200A can implement suitable communications for diagnosing the network settings of the MFP 200A, the MFP 200A can acquire the diagnostic results response B that includes suitable results information.

In the embodiment, the destination IP address specifying the destination for the LPR connection request A (FIG. 4(C)) and the RAW connection request A (FIG. 4(D)) transmitted from the server 300 is identical to the source address (GIP_M, for example) specifying the source for the diagnostics request B (FIG. 4(B)) received by the server 300 (S20 and the like in FIGS. 3 and 8). Consequently, if the ports with port number P_lpr and P_raw have security issues, the MFP 200A can receive the LPR connection request B and the RAW connection request B. For example, the MFP 200A can receive the LPR connection request B and the RAW connection request B when the port forwarding function is enabled for ports having port numbers P_lpr and P_raw or when the global IP address has been assigned to the MFP 200A, as in the example of FIG. 10 described later. However, the MFP 200A does not receive the LPR connection request B or the RAW connection request B when there are no security issues with the ports having port numbers P_lpr and P_raw.

For example, it is possible that the MFP 200A could have been physically moved or have had its wiring physically modified prior to starting up, i.e., prior to the power to the MFP 200A being turned on. Consequently, the network connection status and network settings for the MFP 200A may be modified when the MFP 200A is started up. Such modifications could produce security issues in ports of the MFP 200A. In the embodiment, when the power to the MFP 200A is turned on and the MFP 200A starts up, the MFP 200A transmits the diagnostics request A to the server 300 (S14 of FIG. 8). Therefore, the MFP 200A can transmit the diagnostics request A to execute the diagnostics process on its network settings at a suitable timing, and specifically at a timing when security issues could occur.

Further, if a port is newly determined to be vulnerable in the results outputting process of the embodiment (S130: YES in FIG. 5), the CPU 210 adds warning information for the port newly determined to be vulnerable to the settings screen data (S140 of FIG. 5). In other words, when the status of the MFP 200A changes from one having no security issues (a status with no vulnerable ports) to one having security issues (a status with vulnerable ports), the MFP 200A switches the settings screen W4 from a state in which the warning EM is not displayed to a state in which the warning EM is displayed (see FIG. 7).

Consider the case in which network settings are modified from the non-recommended configuration A described above to the recommended configuration. In the settings diagnostic process executed with the non-recommended configuration A (FIG. 8) prior to the network settings being switched to the recommended configuration, the MFP 200A transmits the LPR response A and the RAW response A to the server 300 (S34B, S36B, S37B, and S38B of FIG. 8) as responses to the LPR connection request B and the RAW connection request B which are respectively based on the LPR connection request A and the RAW connection request A transmitted from the server 300 (S22, S24B, S26, and S28B of FIG. 8). The MFP 200A receives the diagnostic results response B (S42 and S46 of FIG. 8) that includes results information. Here the results information is based on the LPR response A and the RAW response A and specifies security issues in ports having port numbers P_lpr and P_raw (hereinafter called "vulnerable results information"). When the settings diagnostic process (FIG. 3) is repeated after the network settings have been switched to the recommended configuration, the MFP 200A transmits to the server 300 none of the LPR response A and the RAW response A which are responses to the LPR connection request B and the RAW connection request B based on the LPR connection request A and the RAW connection request A (S22 and S26 of FIG. 3) transmitted from the server 300. By not transmitting the LPR response A and the RAW response A to the server 300, the MFP 200A receives the diagnostic results response B from the server 300 (S42 and S46 of FIG. 3) that includes results information different from the vulnerable results previously received. The results information in the new diagnostic results response B specifies that there are no security issues with ports having port numbers P_lpr and P_raw (hereinafter called "secure results information"). Since the CPU 210 determines that there are ports newly determined to be secure in the results outputting process in S48 of FIG. 3 when the MFP 200A has received the secure results information (S150: YES of FIG. 5), the CPU 210 deletes warning information for ports newly found to be secure from the settings screen data (S160). In other words, the MFP 200A switches the settings screen W4 from a state displaying a warning EM (FIG. 7) to a state not displaying a warning EM. Thus, when security issues are resolved for ports having port numbers P_lpr and P_raw, the status of the MFP 200A can be properly changed.

To output a warning to the user of the MFP 200A in the embodiment, the CPU 210 displays the warning screen WI on the display 240 (see FIG. 6(A)) that includes information related to security issues in ports with port numbers P_lpr and P_raw. The CPU 210 also notifies the user of the security issues by transmitting the settings screen data representing the settings screen W4 (FIG. 7) including the warning EM to the terminal device 10A connected to the MFP 200A. In this way, the CPU 210 can suitably provide the user with information about security issues concerning the MFP 200A.

Further, the server 300 in the embodiment transmits the LPR connection request A to the MFP 200A over the internet 80 (S22 and S24B of FIG. 8) and receives the LPR response B from the MFP 200A via the internet 80 as a response to the LPR connection request A (S34B and S36B of FIG. 8). The server 300 also transmits the RAW connection request A to the MFP 200A over the internet 80 (S26 and S28B of FIG. 8) and receives the RAW response B from the MFP 200A via the internet 80 as a response to the RAW connection request A (S37B and S38B of FIG. 8). The CPU 310 generates the results information related to the security issues in ports having port numbers P_lpr and P_raw (S41 of FIG. 8) on the basis of the received LPR response B and the received RAW response B. After generating the results information, the server 300 transmits the diagnostic results response A that includes this results information to the MFP 200A over the internet 80 (S42 and S46 of FIG. 8). Accordingly, the server 300 causes the MFP 200A to execute a process for addressing the security issues in ports having port numbers P_lpr and P_raw.

A-4: Other Non-Recommended Configurations and Operations Performed Under Those Non-Recommended Configurations Next, an example of non-recommended configurations B-D different from non-recommended configuration A described above and the operations of the system 1000 performed under those non-recommended configurations B-D will be described.

A-4-1. Non-Recommended Configuration B

Under the non-recommended configuration B, a global IP address is assigned to the MFP 200A. In this case, the relay device 30A operates as a hub and a data circuit-terminating unit, but does not operate as a router, for example, and an IP address is not assigned to the relay device 30A, and thus the address translation function is not impelmented. Alternatively, the relay device 30A may operate as a hub, a router, and a data circuit-terminating unit while not implementing the address translation function described above, and a global IP address different from that assigned to the MFP 200A may be assigned to the relay device 30A. Here, it will be assumed that the global IP address GIP_M is assigned to the MFP 200A in the non-recommended configuration B.

Under the non-recommended configuration B, an external apparatus can transmit a request to the MFP 200A over the internet 80 initially with the MFP 200A acting as a server and the external apparatus acting as a client, provided that the external apparatus knows the global IP address GIP_M of the MFP 200A. Accordingly, the external apparatus of a third party can more easily transmit requests and the like to the MFP 200A over the internet 80 under the non-recommended configuration B than under the recommended configuration. As a result, there is greater potential for a third party to use the above-described services (the LPR printing service and the information provision service, for example) provided by the MFP 200A over the internet 80. Hence, the security level under the non-recommended configuration B is lower than that under the recommended configuration and may give rise to security issues. Note that all three ports on the MFP 200A described above that are subjected to diagnostics, i.e., ports having port numbers P_lpr, P_raw, and P_snmp (ports for the LPR printing service, the RAW printing service, and the information provision service) are open under the non-recommended configuration B. Further, under the non-recommended configuration B, when the relay device 30A receives a request over the internet 80 that includes a particular port number as the destination port number, for example, the relay device 30A does not implement a function for restricting the transmission of that request to the MFP 200A (also called a "firewall function").

Figure 10:
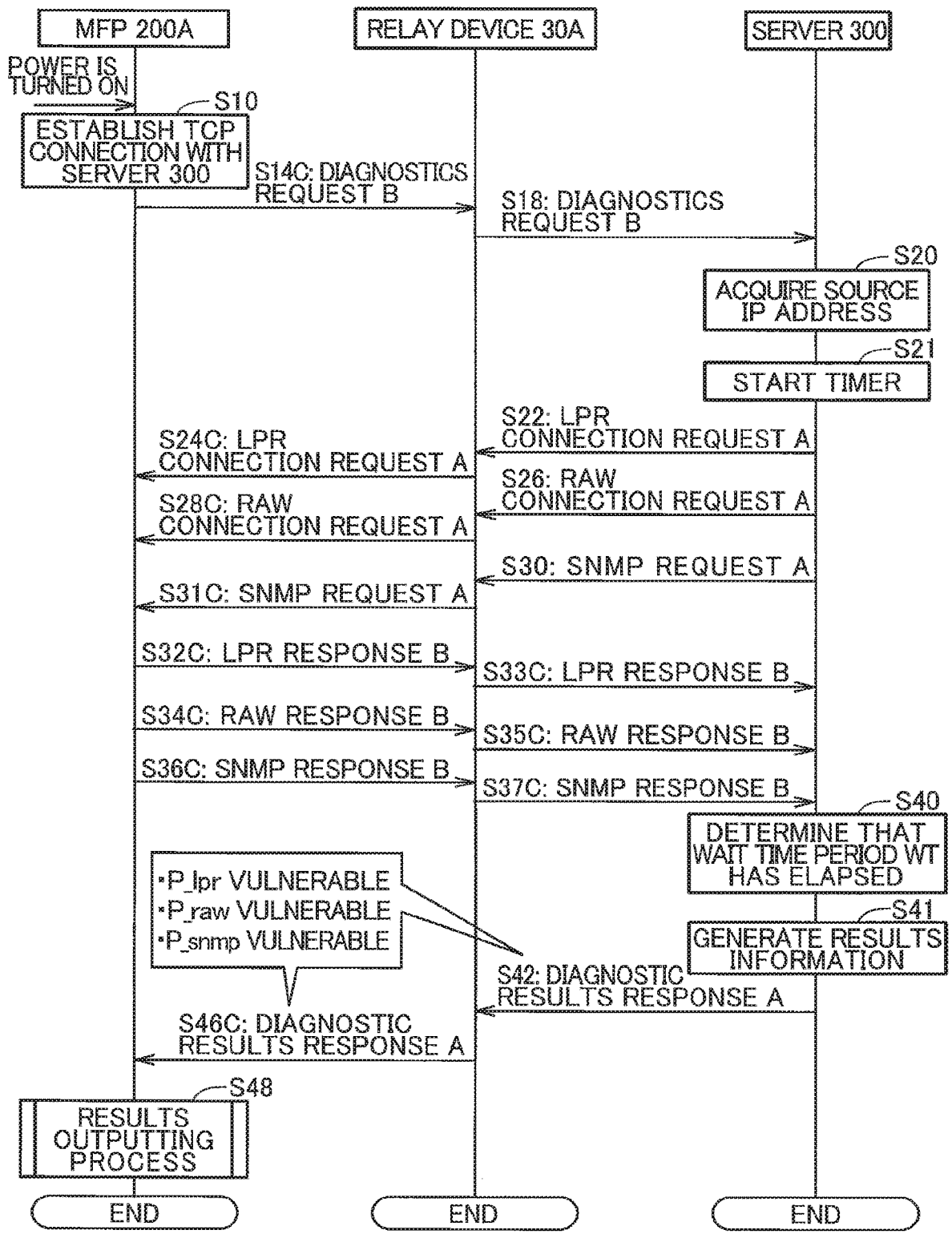
FIG. 10 is a third sequence diagram for the settings diagnostic process in a case where a non-recommended configuration is set.

FIG. 10 is a third sequence diagram for the settings diagnostic process. The third sequence diagram shows the sequence of operations performed when the non-recommended configuration B has been set. In FIG. 10, steps identical to those in FIG. 3 are designated with the same step numbers, while steps different from those in the process of FIG. 3 have a "C" appended to the step number.

While the MFP 200A transmits diagnostics request A in FIG. 4(A) over the local area network LN1 in S14 of FIG. 3, in S14C of FIG. 10 the MFP 200A transmits the diagnostics request B shown in FIG. 4(B) over the local area network LN1. The MFP 200A transmits the diagnostics request B because the global IP address GIP_M has been assigned to the MFP 200A, as described above, and hence the source IP address included in the IP header of the diagnostics request will be "GIP_M".

Steps S18, S20, S21, S22, S26, and S30 in FIG. 10 are identical to the same steps in FIG. 3. When the relay device 30A receives the LPR connection request A (FIG. 4(C)) in S22, in S24C the relay device 30A transmits this LPR connection request A to the MFP 200A over the local area network LN1 since the destination IP address in the LPR connection request A is the global IP address GIP_M of the MFP 200A. Similarly, when the relay device 30A receives the RAW connection request A (FIG. 4(D)) in S26, in S28C the relay device 30A transmits this RAW connection request A to the MFP 200A over the local area network LN1. When the relay device 30A receives the SNMP request A (FIG. 4(E)) in S30, in S31C the relay device 30A transmits this SNMP request A to the MFP 200A over the local area network LN1.

In response to receiving the LPR connection request A in S24C, in S32C the MFP 200A transmits the LPR response B (see FIG. 9(C)) over the local area network LN1. The LPR response B is a response to the LPR connection request A for the purpose of providing the LPR printing service. The source IP address included in the IP header of LPR response B transmitted in S32C is the IP address of the MFP 200A, and specifically the global IP address GIP_M. In response to receiving LPR response B in S32C, in S33C the relay device 30A transmits this LPR response B as is over the internet 80, and the server 300 receives this LPR response B via the internet 80.

Similarly, in response to receiving the RAW connection request A in S28C, in S34C the MFP 200A transmits the RAW response B (see FIG. 9(F)) over the local area network LN1 as a response to the RAW connection request A. In response to receiving the RAW response B in S34C, in S35C the relay device 30A transmits this RAW response B as is over the internet 80. In response to receiving the SNMP request A in S31C, in S36C the MFP 200A transmits the SNMP response B over the local area network LN1 as a response to this SNMP request A. In response to receiving the SNMP response B in S36C, in S37C the relay device 30A transmits this SNMP response B as is over the internet 80. The server 300 receives the RAW response B and the SNMP response B via the internet 80.

Once the wait time period WT has elapsed, in S40 the server 300 determines that the wait time period WT has elapsed. When the server 300 receives all three responses (LPR response B, RAW response B, and SNMP response B) to the three requests (LPR connection request A, RAW connection request A, and SNMP request A) corresponding to the three ports being subjected to diagnostics, in S41 the server 300 generates results information. In this case, the server 300 can determine that all ports having port numbers P_lpr, P_raw, and P_snmp are vulnerable ports. Hence, in S41 of the example in FIG. 10, the server 300 generates the results information specifying that all three ports being subjected to diagnostics are vulnerable ports.

In S42, as in FIG. 3, the server 300 transmits a diagnostic results response A including the results information (see FIG. 4(F)) over the internet 80 as a response to diagnostics request B received in S18. In S46C the relay device 30A transmits the diagnostic results response A over the local area network LN1, and the MFP 200A receives the diagnostic results response A via the local area network LN1. In S48 the MFP 200A executes the results outputting process of FIG. 5.

According to the example of FIG. 10, the diagnostic results response A received by the MFP 200A in S46C indicates that all three ports subjected to diagnostics are vulnerable ports. Accordingly, the MFP 200A displays a warning screen (not shown) on the display 240 in the results outputting process of S48 that indicates all three ports are vulnerable (S110: YES and S120 of FIG. 5). If warning information related to at least one of these ports has not yet been added to the settings screen data at the start of the results outputting process, the MFP 200A adds warning information for the at least one of these ports at this time (S130: YES and S140 of FIG. 5).

A-4-2. Non-Recommended Configuration C

Under the non-recommended configuration C, of the three ports in the MFP 200A that are subjected to the diagnostics described above, the port with port number P_lpr is open while ports having port numbers P_raw and P_snmp are closed. When a port is closed and the MFP 200A receives a request specifying the port number of that port as the destination port number, the MFP 200A discards this request without transmitting a response. All other network settings under the non-recommended configuration C are identical to those under the non-recommended configuration B.

Figure 11:
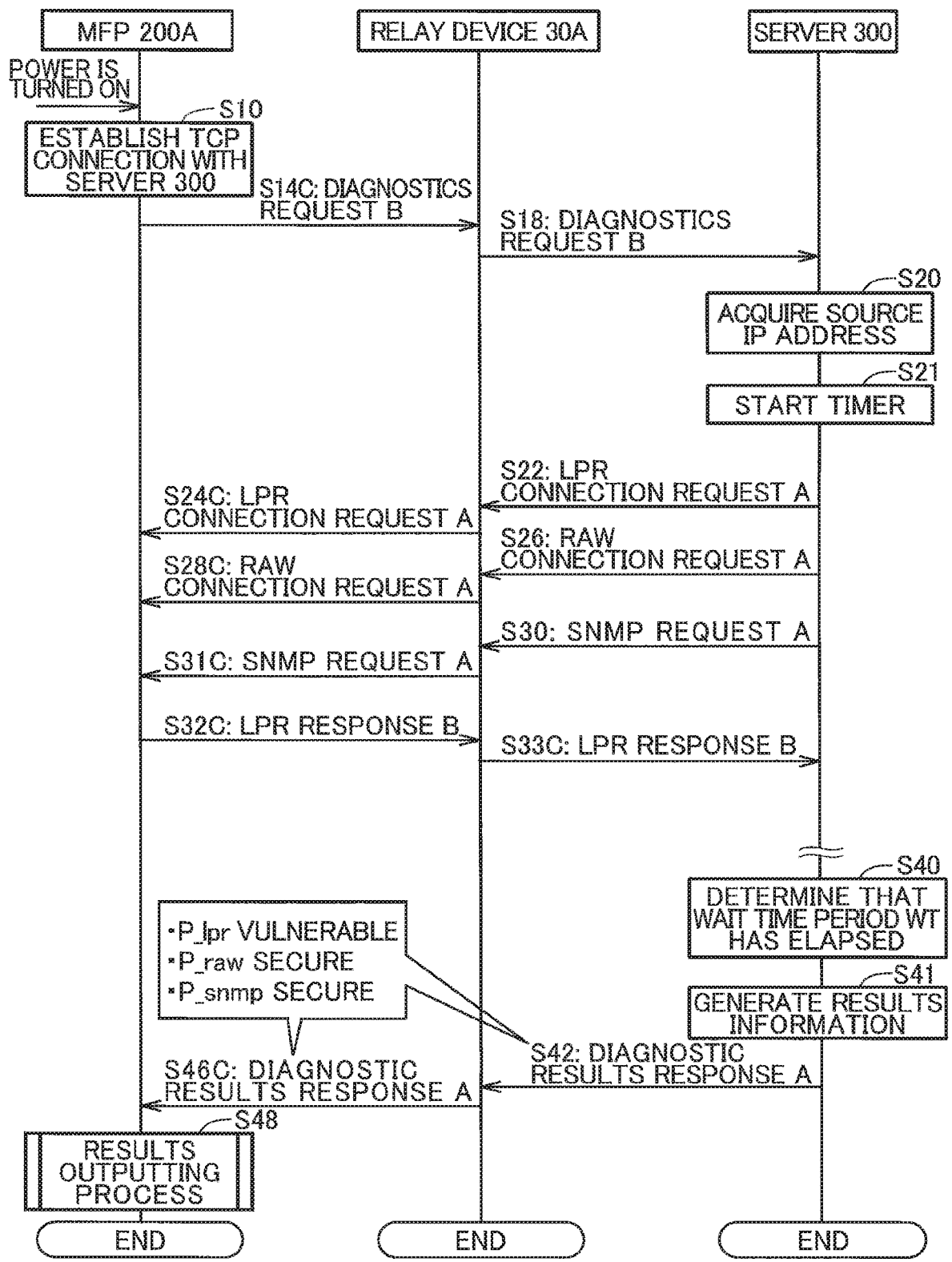
FIG. 11 is a fourth sequence diagram for the settings diagnostic process in a case where a non-recommended configuration is set.

FIG. 11 is a fourth sequence diagram for the settings diagnostic process. The fourth sequence diagram shows the sequence of operations when the non-recommended configuration C has been set. In FIG. 11, steps identical to those in FIG. 10 are designated with the same step numbers.

Steps S10 through S31C of FIG. 11 are identical to steps having the same step numbers in FIG. 10. Thus, in FIG. 11 the MFP 200A receives three requests in S24C, S28C, and S31C, and specifically the LPR connection request A, the RAW connection request A, and the SNMP request A. In response to the LPR connection request A that includes the port number P_lpr, which is an open port, as the destination port number, the MFP 200A transmits the LPR response B over the local area network LN1. The MFP 200A transmits none of responses to the RAW connection request A and the SNMP request A that include port numbers P_raw and P_snmp, which are closed ports, as the corresponding destination port numbers.

Specifically, in response to receiving the LPR connection request A in S24C, in S32C the MFP 200A transmits the LPR response B (see FIG. 9(C)) over the local area network LN1 as a response to the LPR connection request A. In response to receiving the LPR response B in S32C, in S33C the relay device 30A transmits the LPR response B as is over the internet 80, and the server 300 receives this LPR response B via the internet 80.

Once the wait time period WT has elapsed, in S40 the server 300 determines that the wait time period WT has elapsed, as described in FIG. 10. Up to this point, the server 300 has received the LPR response B in response to the LPR connection request A, but has not received responses to the RAW connection request A or the SNMP request A. Hence, in this case, the server 300 can determine that the port having port number P_lpr is a vulnerable port and that ports having port numbers P_raw and P_snmp are secure ports.

In S41 the server 300 generates results information. In the example of FIG. 11, the server 300 generates results information specifying that the port having port number P_lpr is a vulnerable port, while ports having port numbers P_raw and P_snmp are secure ports.

In S42 the server 300 transmits a diagnostic results response A (see FIG. 4(F)) that includes the results information over the internet 80 as a response to the diagnostics request B received in S18. In S46C the relay device 30A transmits the diagnostic results response A over the local area network LN1, and the MFP 200A receives the diagnostic results response A via the local area network LN1. In S48 the MFP 200A executes the results outputting process of FIG. 5.

According to the example of FIG. 11, the diagnostic results response A received by the MFP 200A in S46C indicates that, among the three ports subjected to diagnostics, only the port having port number P_lpr is vulnerable, while the ports with port numbers P_raw and P_snmp are secure. Accordingly, the MFP 200A displays a warning screen (not shown) on the display 240 in the results outputting process of S48 that indicates the port having port number P_lpr is a vulnerable port (S110: YES and S120 of FIG. 5). If warning information for the port having port number P_lpr has not yet been added to the settings screen data at the start of the results outputting process, the MFP 200A adds warning information for the port having port number P_lpr at this time (S130: YES and S140 of FIG. 5).

As can be seen from the above example, the MFP 200A receives the RAW request and the SNMP request from the server 300 via the internet 80, and these requests include port numbers P_raw and P_snmp as the destination port numbers (S28C and S31C of FIG. 11). Since the ports with port numbers P_raw P_snmp are closed, the MFP 200A does not transmit responses to the server 300 as responses to receiving the RAW request and the SNMP request. Thus, the server 300 determines that the ports having port numbers P raw and P_snmp are secure ports. Accordingly, the MFP 200A does not execute and addressing process for addressing security issues in the ports with port numbers P_raw and P_snmp. In other words, the MFP 200A does not display a warning screen specifying the ports having port numbers P_raw and P_snmp as vulnerable ports, for example. The MFP 200A does not perform processes for addressing security issues on ports having no security issues (the ports with port numbers P_raw and P_snmp in this case). Therefore, this process can more suitably deal with security issues on the MFP 200A.

A-4-2. Non-Recommended Configuration D

Under the non-recommended configuration D, if the relay device 30A receives requests over the internet 80 that include respectively port number P_raw and P_snmp as the destination port number, the relay device 30A implements a firewall function to prevent these requests from being transmitted to the MFP 200A. If the relay device 30A receives a request over the internet 80 that includes port number P_lpr as the destination port number, the relay device 30A allows this request to be transmitted to the MFP 200A. All other network settings under the non-recommended configuration D are identical to those under the non-recommended configuration B.

FIG. 12 is a fifth sequence diagram for the settings diagnostic process. The fifth sequence diagram shows the sequence of steps performed when the non-recommended configuration D has been established. In FIG. 12, steps identical to those in the process of FIG. 10 are designated with the same step numbers.

Steps S10 through S22, S26, and S30 in FIG. 12 are identical to steps having the same step numbers in FIG. 10. Hence, in the example of FIG. 12 the relay device 30A receives three requests in S22, S26, and S30, and specifically the LPR connection request A, the RAW connection request A, and the SNMP request A. In S24C the relay device 30A transmits the LPR connection request A to the MFP 200A over the local area network LN1. However, the relay device 30A does not transmit the RAW connection request A or the SNMP request A to the MFP 200A owing to the firewall function. Consequently, the MFP 200A receives the LPR connection request A, but does not receive the RAW connection request A or the SNMP request A.

In response to receiving the LPR connection request A in S24C, in S32C the MFP 200A transmits the LPR response B (see FIG. 9(C)) over the local area network LN1 as a response to the LPR connection request A. In response to receiving the LPR response B in S32C, in S33C the relay device 30A transmits this LPR response B as is over the internet 80, and the server 300 receives the LPR response B via the internet 80.

Once the wait time period WT has elapsed, as described in FIGS. 10 and 11, in S40 the server 300 determines that the wait time period WT has elapsed. Up to this point, the server 300 has received the LPR response B as a response to the LPR connection request A, but has received none of responses to the RAW connection request A and the SNMP request A. Hence, in this case, as in the case of FIG. 11, the server 300 can determine that the port having port number P_lpr is vulnerable, while ports having port numbers P_raw and P_snmp are secure.

In S41 of the example in FIG. 12, the server 300 generates results information. As in the example of FIG. 11, the server 300 generates results information specifying that the port having port number P_lpr is a vulnerable port, while ports having port numbers P_raw and P_snmp are secure ports.

In S42 the server 300 transmits diagnostic results response A (see FIG. 4(F)) that includes this results information over the internet 80 as the response to the diagnostics request B received in S18. In S46C the relay device 30A transmits the diagnostic results response A over the local area network LN1, and the MFP 200A receives the diagnostic results response A via the local area network LN1. In S48 the MFP 200A executes the results outputting process of FIG. 5.

According to the example of FIG. 12, the diagnostic results response A received by the MFP 200A in S46C indicates that the port having port number P_lpr is a vulnerable port, but ports having port numbers P_raw and P_snmp are secure ports. Accordingly, the MFP 200A displays a warning screen (not shown) on the display 240 in the results outputting process of S48 that specifies the port having port number P_lpr as a vulnerable port (S110: YES and S120 of FIG. 5). If warning information related to the port with port number P_lpr has not yet been added to the settings screen data at the start of the results outputting process, the MFP 200A adds warning information for the port having port number P_lpr at this time (S130: YES and S140 of FIG. 5).

The server 300 is an example of an external device. The port having port number P_lpr is an example of a first port. The LPR connection requests A and B are examples of a first request. The LPR requests A and B are examples of a first response. The port having port number P_raw is an example of a second port. The RAW connection requests A and B are examples of a second request. The RAW responses A and B are examples of a second request. A state where the settings screen W4 does not display the warning EM is an example of a first state. A state where the settings screen W4 displays the warning EM is an example of a second state.

B. Variations of the Embodiment (1) In the embodiment described above, the MFP 200A transmits the diagnostics request A or B to the server 300 when the MFP 200A is started up (for example, S14 and S18 in FIGS. 3 and 8). However, the MFP 200A may transmit a diagnostics request to the server 300 at the following timings in addition to or instead of the timing described in the embodiment.
A) When communication-related settings for the MFP 200A are modified
B) When the MFP 200A connects to the internet 80 and becomes capable of communicating with the same
C) When instructed by the user The communication-related settings in A) may include the value of the IP address assigned to the MFP 200A, the value of the subnet mask, the default gateway, and the open/closed settings for ports. These communication-related settings may be inputted by the user on the operation interface 250 or the terminal device 10A, for example.

The determination for B) as to whether the MFP 200A has been connected to the internet 80 may be executed as follows. For example, the MFP 200A may be configured to access a prescribed server (not shown) at prescribed intervals in order to determine whether there are any updates to the computer program PG1 of the MFP 200A (including firmware). The MFP 200A determines that it is connected to and capable of communicating with the internet 80 when the MFP 200A succeeds in accessing the prescribed server at this time, and determines that it is not connected to the internet 80 when access fails.

In the embodiment, the MFP 200A transmits the diagnostics request A or B to the server 300 when starting up. However, if the MFP 200A is not physically connected to the local area network LN1, the MFP 200A cannot transmit a diagnostics request at this time. In such a case, the MFP 200A cannot execute the settings diagnostic process until the MFP 200A determines that it is connected to and capable of communicating with the internet 80. In this case, the CPU 210 of the MFP 200A may display a screen W3 shown in FIG. 6(C) on the display 240. The screen W3 includes a message Ms3 indicating that the settings diagnostic process has not been performed. In this way, the MFP 200A can notify the user that the settings diagnostic process is not currently performed and there could be security issues with some ports.

(2) In the embodiment described above, the server 300 transmits the LPR connection request A, the RAW connection request A, and the SNMP request A to the MFP 200A after receiving the diagnostics request B which is originally transmitted from the MFP 200A. However, the server 300 may be configured to transmit the LPR connection request A, the RAW connection request A, and the SNMP request A to the MFP 200A at a different timing. For example, the server 300 may transmit these requests to the MFP 200A every few hours, for example, in order to periodically confirm whether these ports have security issues. In this case, the server 300 may transmit results information indicating whether there are security issues in ports to the MFP 200A of its own accord or in response to a request from the MFP 200A, for example.

(3) When the server 300 transmits the LPR connection request A, the RAW connection request A, and the SNMP request A to the MFP 200A in the embodiment, the server 300 sets the destination IP address to the source IP address included in the diagnostics request B. However, the server 300 may instead receive an IP address which is provided by the MFP 200A in advance, and set the destination IP address to the IP address provided in advance when transmitting the LPR connection request A, the RAW connection request A, and the SNMP request A to the MFP 200A.

(4) In the results outputting process of FIG. 5 described in the embodiment, the MFP 200A displays a warning screen on the display 240 (S120 of FIG. 5) and adds warning information to the settings screen data (S140 of FIG. 5) when there are vulnerable ports. However, the MFP 200A may perform a process to close the vulnerable ports instead of or in addition to the processes described above, for example. Alternatively, the MFP 200A may notify the user of vulnerable port information by transmitting email including the port numbers of the vulnerable ports to a preregistered email address for the administrator. In addition, one of the processes to display a warning screen on the display 240 (S120 of FIG. 5) and to add warning information to the settings screen data (S140 of FIG. 5) may be omitted. Step S125 of FIG. 5 may also be omitted. In other words, the screen W2 shown in FIG. 6(B) need not be displayed on the display 240 when there are no vulnerable ports.

Further, the type of warning message displayed on the display 240 is not limited to the display shown in FIG. 6(A). For example, the MFP 200A may display the warning EM included in the settings screen W4 of FIG. 7 on the display 240 continuously while having determined that vulnerable ports exist.

(5) In the results outputting process of FIG. 5 described in the embodiment, the process of S150 and S160 may be omitted. In this case, the warning EM may be deleted from the settings screen W4 (FIG. 7) in response to a user instruction, for example.

(6) In the embodiment, TCP is used as the protocol in the transport layer for transmitting and receiving the LPR connection requests A and B, the RAW connection requests A and B, the LPR responses A and B, and the RAW responses A and B, and UDP is used as the protocol in the transport layer for transmitting and receiving the SNMP requests A and B and the SNMP responses A and B. However, other protocols, including proprietary protocols developed by the manufacturer of the MFP 200A, may be used in place of these protocols, for example.

(7) In the embodiment, the results information included in the diagnostic results response A specifies whether each of the three ports being subjected to diagnostics is a secure port or a vulnerable port. However, the results information may be configured of the message Ms1 or Ms2 and the text Tx1 to be included in the screen W1 or W2 shown in FIGS. 6(A) and 6(B), for example. In this case, the MFP 200A may display the message Ms1 or Ms2 and the text Tx1 in S48 of FIG. 3, 8, or the like.

(8) In the embodiment, transmission/reception of the diagnostics requests A and B (S14 and S18 of FIG. 3, for example) and transmission/reception of the diagnostic results responses A and B (S42 and S46 of FIG. 3, for example) are implemented using HTTP. However, transmission/reception of diagnostics requests A and B and diagnostic results responses A and B may be implemented using the more secure Hypertext Transfer Protocol Secure (HTTPS).

(9) The server 300 may transmit other requests, such as an HTTP connection request for the settings management service described above in addition to or together with all or some of steps S22, S26, and S30 in FIG. 3 or the like. Note that the destination port number used in the HTTP connection request in this case is a different port number from port number P_mfp of the MFP 200A used for communications in S14 and S42. That is, the port number of the MFP 200A (P_mfp) used for transmitting and receiving the diagnostics requests A and B and the diagnostic results responses A and B when the MFP 200A serves as a client differs from the port number of the MFP 200A used for transmitting an HTTP connection request from the server 300 when the MFP 200A serves as a server. Thus, since the relay device 30A will not relay an HTTP connection request from the server 300 under the recommended configuration, this HTTP connection request will not reach the MFP 200A. Accordingly, the server 300 can reliably confirm whether the port used for the settings management service on the MFP 200A is secure.

(10) In the embodiment, the relay device 30A employs NAPT as the address translation function. However, the relay device 30A may employ network address translation (NAT) instead.

(11) In the embodiment, the multifunction peripherals 200A and 200B are used as the communication apparatus. However, an image processing apparatus, such as a scanner, a printer, or a digital camera, may be used as the communication apparatus. Alternatively, other types of communication apparatuses such as a storage device and a personal computer may be used as the communication apparatus.

(12) The server 300 may be a cloud server having a plurality of apparatuses (for example, computers) capable of communicating with each other via a network.

(13) Part of the configuration of the invention implemented in hardware in the embodiment described above may be replaced by software and, conversely, part of the configuration of the invention implemented in software may be replaced by hardware.

(14) When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments, it would be apparent to those skilled in the art that various changes and modifications may be made thereto.

What is claimed is:

1. A communication apparatus comprising a processor configured to perform:
    transmitting a diagnostics request to an external apparatus via an internet, the diagnostics request being for requesting the external apparatus to initiate security related diagnostics;

after transmitting the diagnostics request, receiving a first request from the external device via the internet, the first request having first port information indicating a first port;

in response to receiving the first request, transmitting a first response to the external device via the internet, the first response, when received by the external device, prompting the external device to make a first determination that a security issue concerning the first port exists;

after transmitting the diagnostics request, receiving a second request from the external device via the internet, the second request having second port information indicating a second port;

in response to receiving the second request, transmitting a second response to the external device via the internet, the second response, when received by the external device, prompting the external device to make a second determination that a security issue concerning the second port exists;

after transmitting the first response and the second response, receiving result information from the external device via the internet as a response to the diagnostics request, the result information being based on a fact that the external apparatus receives the first response and the second response, and the result information being further based on the first determination and the second determination, the result information indicating that a security issue concerning the first port and the second port exists; and performing an addressing process on a basis of the result information, the addressing process being for addressing the security issue concerning the first port and the second port.

2. The communication apparatus according to claim 1, wherein the transmitting a diagnostics request and the receiving result information are performed with the communication apparatus acting as a client and the external device acting as a server, wherein the receiving a first request and the transmitting a first response are performed with the communication apparatus acting as a server and the external device acting as a client, wherein the first response is transmitted as a response to the first request, wherein the receiving a second request and the transmitting a second response are performed with the communication apparatus acting as a server and the external device acting as a client, wherein the second response is transmitted as a response to the second request.

3. The communication apparatus according to claim 2, wherein the processor is configured to further perform establishing TCP connection in conformance with Transmission Control Protocol between the communication apparatus and the external device via the internet, wherein the transmitting a diagnostics request and the receiving result information are performed using the TCP connection.

4. The communication apparatus according to claim 1, wherein the first request has a destination address indicating a transmission source of the diagnostics request, and the second request has a destination address indicating a transmission source of the diagnostics request.

5. The communication apparatus according to claim 1, wherein the transmitting a diagnostics request is performed in at least one of a case where the communication apparatus starts up, a case where settings about communication are changed in the communication apparatus, and a case where the communication apparatus is connected to the internet.

6. The communication apparatus according to claim 1, wherein the processor is configured to further perform receiving a third request having third port information indicating a third port, wherein in a case where the communication apparatus has communication settings which prohibits transmitting a third response in response to receiving the third request, the processor does not perform a process for addressing security issue concerning the third port.

7. The communication apparatus according to claim 1, wherein the addressing process includes a switching process to switch a state of the communication apparatus from a first state to a second state, wherein the first state is not adjusted to the security issue, wherein the second state is adjusted to the security issue, wherein the processor is configured to further perform:
receiving second result information from the external device via the internet, the second result information being different from the result information and based on a fact that the external device receives neither the first response nor the second response from the communication apparatus; and in a case where the second result information is received, performing a process to switch the state of the communication apparatus from the second state to the first state.

8. The communication apparatus according to claim 1, wherein the receiving a first request, the receiving a second request, the transmitting a first response, and the transmitting a second response are performed using at least one of Transmission Control Protocol and User Datagram Protocol as a protocol of a transport layer.

9. The communication apparatus according to claim 1, further comprising a display, wherein the addressing process includes at least one of a display process or a notification process, the display process displaying on the display specific information on the security issue concerning the first port and the second port, the notification process notifying the specific information to a terminal device connected to the communication apparatus.

10. A non-transitory computer readable storage medium storing a set of program instructions for a communication apparatus, the set of program instructions comprising:

transmitting a diagnostics request to an external apparatus via an internet, the diagnostics request being for requesting the external apparatus to initiate security related diagnostics;

after transmitting the diagnostics request, receiving a first request from the external device via the internet, the first request having first port information indicating a first port;

in response to receiving the first request, transmitting a first response to the external device via the internet, the first response, when received by the external device, prompting the external device to make a first determination that a security issue concerning the first portion exists;

after transmitting the diagnostics request, receiving a second request from the external device via the internet, the second request having second port information indicating a second port;

in response to receiving the second request, transmitting a second response to the external device via the internet, the second response, when received by the external device, prompting the external device to make a second determination that a security issue concerning the second port exists;

after transmitting the first response and the second response, receiving result information from the external device via the internet as a response to the diagnostics request, the result information being based on a fact that the external apparatus receives the first response and the second response, the result information being further based on the first determination and the second determination, the result information indicating that a security issue concerning the first port and the second port exists; and performing an addressing process on a basis of the result information, the addressing process being for addressing the security issue concerning the first port and the second port.

11. An information processing apparatus comprising a processor configured to perform:

receiving a diagnostics request from a communication apparatus via an internet, the diagnostics request being for requesting the information processing apparatus to initiate security related diagnostics, after receiving the diagnostics request, transmitting a first request to the communication apparatus via the internet, the first request having first port information indicating a first port;

receiving a first response as a response to the first request from the communication apparatus via the internet;

determining, when the first response is received, that a security issue concerning the first port exists;

after receiving the diagnostics request, transmitting a second request to the communication apparatus via the internet, the second request having second port information indicating a second port;

receiving a second response as a response to the second request from the communication apparatus via the internet;

determining, when the second response is received, that a security issue concerning the second port exists;

generating result information on the basis of the received first response, the received second response, and the determinations, the result information indicating that a security issue concerning the first port and the second port exists; and transmitting the generated result information as a response to the diagnostics request to the communication apparatus via the internet.

12. The communication apparatus according to claim 1, wherein the processor is further configured to perform:

establishing a connection with the external device;

transmitting the diagnostics request using the established connection, the diagnostics request, when received by the external device, prompting the external device to transmit the first request and the second request, wherein after transmitting the first response and the second response, the communication apparatus receives, through the established connection, the result information as a response to the diagnostics request, from the external device.

13. The communication apparatus according to claim 1, wherein in response to the receipt of the result information, a setting screen is displayed on a display having a notification indicating the security issue, the notification enabling the performance of the addressing process, the settings screen comprising a user interface to change at least one setting for a printing process or a scanning process.

* * * * *

UNITED STATES PATENT AND TRADEMARK OFFICE
CERTIFICATE OF CORRECTION

| | | |
|---|---|---|
| PATENT NO. | : 10,922,033 B2 | Page 1 of 1 |
| APPLICATION NO. | : 16/255930 | |
| DATED | : February 16, 2021 | |
| INVENTOR(S) | : Satoshi Suzuki | |

It is certified that error appears in the above-identified patent and that said Letters Patent is hereby corrected as shown below:

In the Claims

Column 27, Claim 1, Line 26 should read:
and the second response, the result information Signed and Sealed this
First Day of June, 2021

Drew Hirshfeld
*Performing the Functions and Duties of the*
*Under Secretary of Commerce for Intellectual Property and*
*Director of the United States Patent and Trademark Office*